United States Patent
Unterluggauer et al.

(10) Patent No.: US 12,001,346 B2
(45) Date of Patent: Jun. 4, 2024

(54) DEVICE, METHOD AND SYSTEM TO SUPPLEMENT A SKEWED CACHE WITH A VICTIM CACHE

(71) Applicant: Intel Corporation, Santa Clara, CA (US)

(72) Inventors: Thomas Unterluggauer, Hillsboro, OR (US); Alaa Alameldeen, Hillsboro, OR (US); Scott Constable, Portland, OR (US); Fangfei Liu, Hillsboro, OR (US); Francis McKeen, Portland, OR (US); Carlos Rozas, Portland, OR (US); Anna Trikalinou, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 656 days.

(21) Appl. No.: 17/127,786

(22) Filed: Dec. 18, 2020

(65) Prior Publication Data

US 2022/0200783 A1 Jun. 23, 2022

(51) Int. Cl.
  *G06F 12/10* (2016.01)
  *G06F 12/121* (2016.01)
  *G06F 12/14* (2006.01)

(52) U.S. Cl.
  CPC .......... *G06F 12/14* (2013.01); *G06F 12/121* (2013.01); *G06F 2212/1052* (2013.01)

(58) Field of Classification Search
  CPC .............. G06F 12/14; G06F 12/121; G06F 2212/1052; G06F 21/72; G06F 21/755; G06F 21/77; H04L 9/0618; H04L 9/0891; H04L 9/003
  See application file for complete search history.

(56) References Cited

U.S. PATENT DOCUMENTS

| | | | |
|---|---|---|---|
| 9,170,955 B2 | 10/2015 | Forsyth et al. | |
| 9,727,489 B1* | 8/2017 | Drerup | G06F 12/0811 |
| 2008/0109625 A1* | 5/2008 | Erlingsson | G06F 12/1441 |
| | | | 711/E12.001 |

OTHER PUBLICATIONS

A. Djordjalian, "Minimally-skewed-associative caches," 14th Symposium on Computer Architecture and High Performance Computing, 2002. Proceedings., Vitoria, Brazil, 2002, pp. 100-107. (Year: 202).*

(Continued)

*Primary Examiner* — Khoa D Doan
(74) *Attorney, Agent, or Firm* — Essential Patents Group, LLP

(57) ABSTRACT

Techniques and mechanisms for a victim cache to operate in conjunction with a skewed cache to help mitigate the risk of a side-channel attack. In an embodiment, a first line is evicted from a skewed cache, and moved to a victim cache, based on a message indicating that a second line is to be stored to the skewed cache. Subsequently, a request to access the first line results in a search of both the victim cache and sets of the skewed cache which have been mapped to an address corresponding to the first line. Based on the search, the first line is evicted from the victim cache, and reinserted in the skewed cache. In another embodiment, reinsertion of the first line in the skewed cache includes the first line and a third line being swapped between the skewed cache and the victim cache.

20 Claims, 14 Drawing Sheets

(56) References Cited

OTHER PUBLICATIONS

Avanzi, Roberto, "The QARMA Block Cipher Family. Almost MDS Matrices Over Rings With Zero Divisors, Nearly Symmetric Even-Mansour Constructions With Non-Involutory Central Rounds, and Search Heuristics for Low-Latency S-Boxes", IACR Transactions of Symmetric Cryptology, 2017, 40 pgs.

Beaulieu, Ray et al., "The Simon and Speck Families of Lightweight Block Ciphers", IACR Cryptology ePrint Archive, vol. 2013, No. 1, 2013, 45 pgs.

Bernstein, Daniel J., "Cache-timing attacks on AES", 2005, 37 pgs.

Borghoff, Julia et al., "PRINCE—a Low-latency Block Cipher for Pervasive Computing Applications", International Conference on the Theory and Application of Cryptology and Information Security, 2012, 25 pgs.

Costan, Victor et al., "Sanctum: Minimal Hardware Extensions for Strong Software Isolation", Proceedings of the 25th USENIX Security Symposium, Aug. 2016, 19 pgs.

Dessouky, Ghada et al., "HYBCACHE: Hybrid Side-Channel-Resilient Caches for Trusted Execution Environments", 2020, 18 pgs.

Domnitser, Leonid et al., "Non-Monopolizable Caches: Low-Complexity Mitigation of Cache Side Channel Attacks", ACM Transactions on Architecture and Code Optimization, vol. 8, No. 4, Article 35, Jan. 2012, 21 pgs.

Evtyushkin, Dmitry et al., "Jump Over ASLR: Attacking Branch Predictors to Bypass ASLR", 49th Annual IEEE/ACM International Symposium on Microarchitecture, 2016, 13 pgs.

Gruss, Daniel et al., "Cache Template Attacks: Automating Attacks on Inclusive Last-Level Caches", Proceedings of the 24th USENIX Security Symposium, Aug. 2015, 17 pgs.

Gruss, Daniel et al., "Flush+Flush: a Fast and Stealthy Cache Attack", Proceedings of the 13th International Conference on Detection of Intrusions and Malware, and Vulnerability Assessment, 2016, 21 pgs.

Gullasch, David et al., "Cache Games—Bringing Access-Based Cache Attacks on AES to Practice", 2011 Symposium on Security and Privacy, 16 pgs.

He, Zecheng et al., "How secure is your cache against side-channel attacks?", Proceedings of MICRO-50, Oct. 2017, 13 pgs.

Inci, Mehmet S. et al., "Seriously, get off my cloud! Cross-VM RSA Key Recovery in a Public Cloud", 2015, 15 pgs.

Irazoqui, Gorka et al., "S$A: a Shared Cache Attack that Works Across Cores and Defies VM Sandboxing—and its Application to AES", IEEE SP, 2015, 14 pgs.

Kayaalp, Mehmet et al., "RIC: Relaxed Inclusion Caches for Mitigating LLC Side-Channel Attacks", Design Automation Conference, 2017, 6 pgs.

Kirianksy, Vladimir et al., "DAWG: a Defense Against Cache Timing Attacks in Speculative Execution Processors", 2018 51st Annual IEEE/ACM International Symposium on Microarchitecture, 14 pgs.

Kocher, Paul et al., "Spectre Attacks: Exploiting Speculative Execution", IEEE Symposium on Security and Privacy, 2019, 19 pgs.

Lipp, Moritz et al., "Meltdown: Reading Kernel Memory from User Space", Proceedings of the 27th USENIX Security Symposium, Aug. 2018, 19 pgs.

Liu, Fangfei et al., "CATalyst: Defeating Last-Level Cache Side Channel Attacks in Cloud Computing", International Symposium on High-Performance Computer Architecture, 2016, 13 pgs.

Liu, Fangfei et al., "Last-Level Cache Side-Channel Attacks are Practical", 2015 IEEE Symposium on Security and Privacy, 18 pgs.

Liu, Fangfei et al., "Newcache: Secure Cache Architecture Thwarting Cache Side-Channel Attacks", IEEE Micro, vol. 36, No. 5, 2016, 9 pgs.

Liu, Fangfei et al., "Random Fill Cache Architecture", 2014 47th Annual IEEE/ACM International Symposium on Microarchitecture, 13 pgs.

Osvik, Dag A. et al., "Cache Attacks and Countermeasures: the Case of AES", CT-RSA 2006, LNCS 3860, pp. 1-20.

Percival, Colin, "Cache Missing for Fun and Profit", BSDCan 2005, 13 pgs.

Purnal, Antoon et al., "Advanced profiling for probabilistic Prime+Probe attacks and convert channels in ScatterCache", 2019, 8 pgs.

Purnal, Antoon et al., "Systematic Analysis of Randomization-based Protected Cache Architectures", 2020, 16 pgs.

Qureshi, Moinuddin K., "CEASER: Mitigating Conflict-Based Cache Attacks via Encrypted-Address and Remapping", Proceedings of the Annual International Symposium on Microarchitecture, MICRO, 2018, 13 pgs.

Qureshi, Moinuddin K., "New Attacks and Defense for Encrypted-Address Cache", 46th International Symposium on Computer Architecture, Jun. 2019, 12 pgs.

Sanchez, Daniel et al., "The ZCache: Decoupling Ways and Associativity", The Proceedings of the 43rd Annual IEEE/ACM Symposium on Microarchitecture (MICRO-43), 2010, 12 pgs.

Tan, Qinhan et al., "PhantomCache: Obfuscating Cache Conflicts with Localized Randomization", Network and Distributed Systems Security (NDSS) Symposium, Feb. 2020, 17 pgs.

Vila, Pepe et al., "Theory and Practice of Finding Eviction Sets", 2019 IEEE Symposium on Security and Privacy, 16 pgs.

Wang, Han et al., "Mitigating Cache-Based Side-Channel Attacks through Randomization: a Comprehensive System and Architecture Level Analysis", 2020, 6 pgs.

Wang, Yao et al., "SecDCP: Secure Dynamic Cache Partitioning for Efficient Timing Channel Protection", Proceedings—Design Automation Conference, 2016, 6 pgs.

Wang, Zhenghong et al., "New Cache Designs for Thwarting Software Cache-based Side Channel Attacks", International Symposium on Computer Architecture, 2007, 12 pgs.

Werner, Mario et al., "ScatterCache: Thwarting Cache Attacks via Cache Set Randomization", Proceedings of the 28th USENIX Security Symposium, Aug. 2019, 19 pgs.

Yan, Mengjia et al., "Attack Directories, Not Caches: Side-Channel Attacks in a Non-Inclusive World", IEEE Symposium on Security and Privacy, May 2019, 17 pgs.

Yan, Mengjia et al., "SecDir: a Secure Directory to Defeat Directory Side-Channel Attacks", The 46th Annual International Symposium on Computer Architecture, Jun. 2019, 14 pgs.

Yan, Mengjia et al., "Secure Hierarchy-Aware Cache Replacement Policy (SHARP): Defending Against Cache-Based Side Channel Attacks", Proceedings of International Symposium on Computer Architecture, 2017, 14 pgs.

Yarom, Yuval et al., "Flush+Reload: a High Resolution, Low Noise, L3 Cache Side-Channel Attack", Proceedings of the 23rd USENIX Security Symposium, Aug. 2014, 15 pgs.

Zhang, Xiao et al., "Towards Practical Page Coloring-based Multicore Cache Management", Proceedings of the 4th ACM European Conference on Computer Systems, 2009, 14 pgs.

* cited by examiner

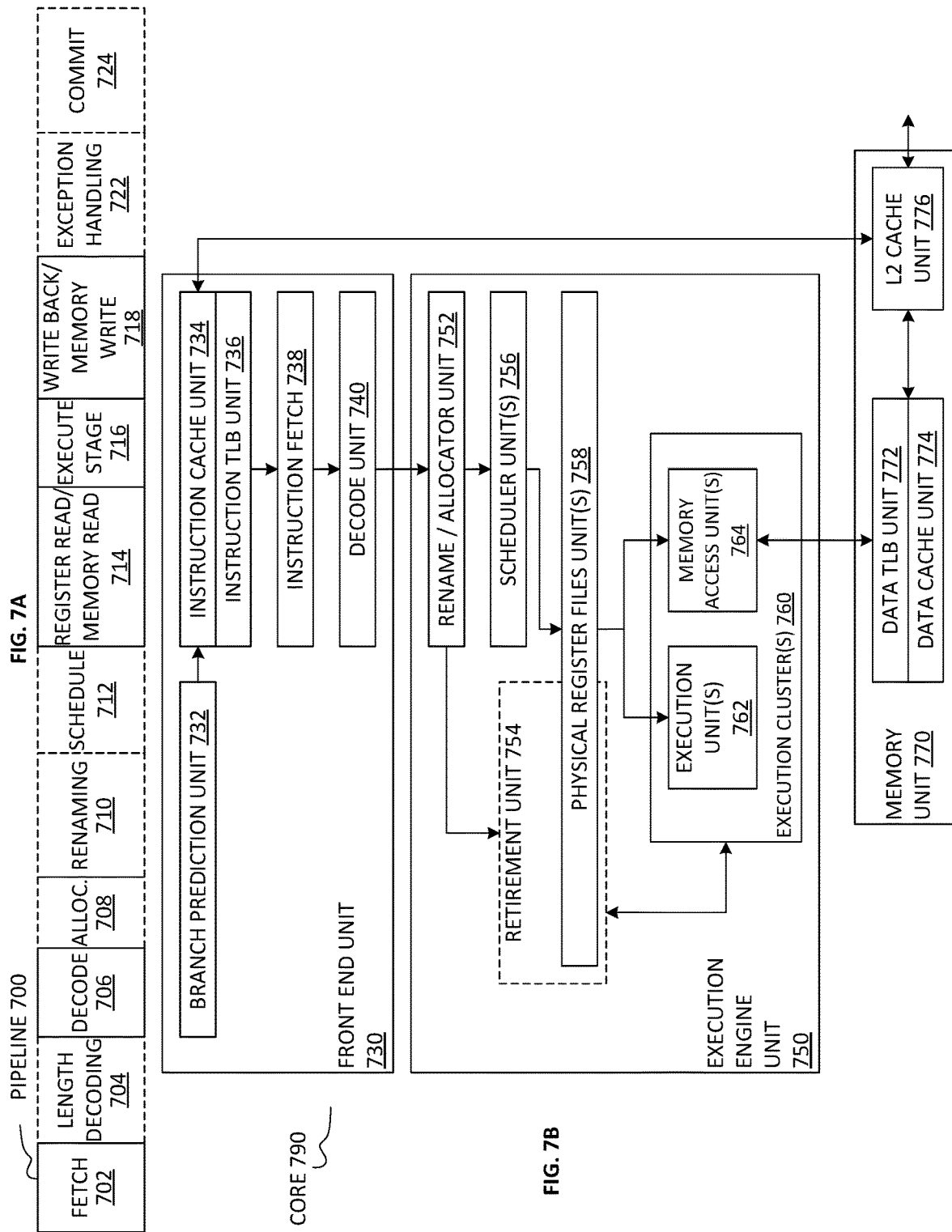

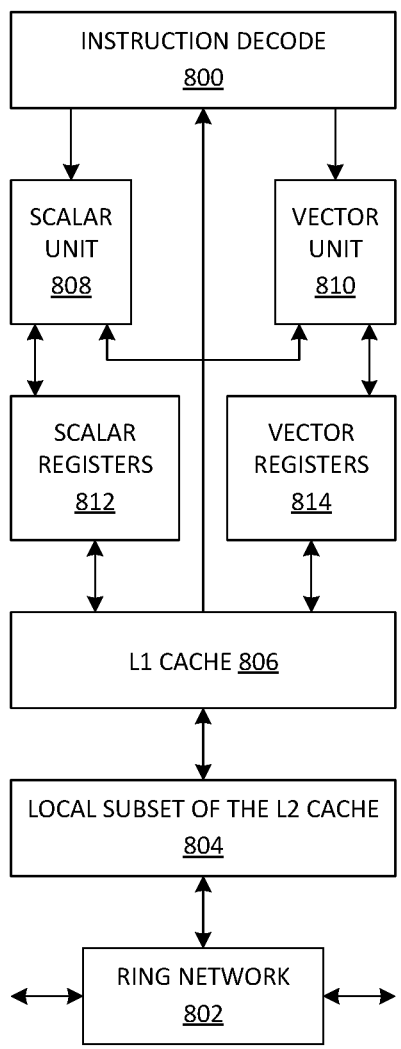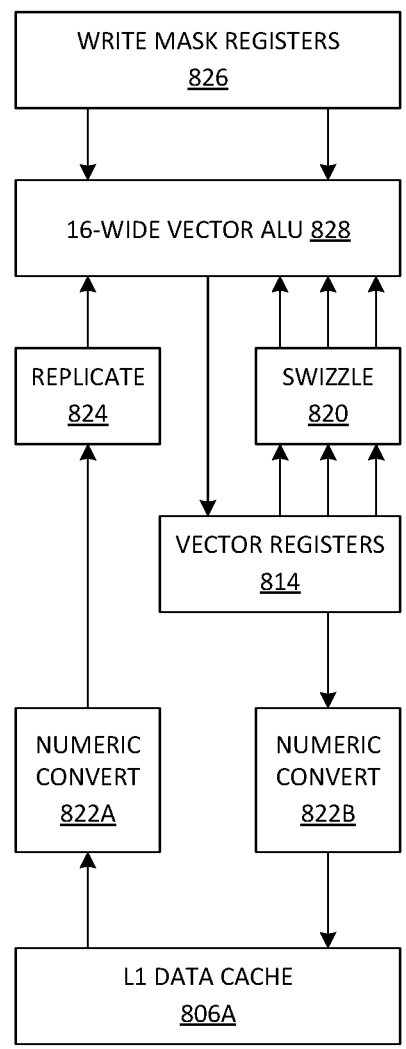
FIG. 8A
FIG. 8B

DEVICE, METHOD AND SYSTEM TO SUPPLEMENT A SKEWED CACHE WITH A VICTIM CACHE

BACKGROUND

1. Technical Field

This disclosure generally relates to cache memory systems and more particularly, but not exclusively, to the use of a victim cache to provide protection from side-channel attacks.

2. Background Art

In a processor-based system, a cache memory is used to temporarily store information including data or instructions to enable more rapid access by processing elements of the system such as one or more processors, graphics devices and so forth. Modern processors include internal cache memories that act as repositories for frequently used and recently used information. Because this cache memory is within a processor package and typically on a single semiconductor die with one or more cores of the processor, much more rapid access is possible than from more remote locations of a memory hierarchy, which include system memory.

To enable maintaining the most relevant information within a cache, some type of replacement mechanism is used. Many systems implement a type of least recently used algorithm to maintain information. More specifically, each line of a cache is associated with metadata information relating to the relative age of the information such that when a cache line is to be replaced, an appropriate line for eviction can be determined.

Over the years, caches have become a source of information leakage that are exposed to "side-channel" attacks whereby a malicious agent is able to infer sensitive data (e.g., cryptographic keys) that is processed by a victim software process. Typically, cache-based side-channel attacks, which exploit cache-induced timing differences of memory accesses, are used to break Advanced Encryption Standard (AES), Rivest-Shamir-Adleman (RSA) or other cryptographic protections, to bypass address-space layout randomization (ASLR), or to otherwise access critical information. As the number and variety of side-channel attacks continue to increase, there is expected to be an increasing demand placed on improved protections to cache memory systems.

BRIEF DESCRIPTION OF THE DRAWINGS

The various embodiments of the present invention are illustrated by way of example, and not by way of limitation, in the figures of the accompanying drawings and in which:

FIG. 7A is a block diagram illustrating both an exemplary in-order pipeline and an exemplary register renaming, out-of-order issue/execution pipeline according to embodiments of the invention.

FIG. 7B is a block diagram illustrating both an exemplary embodiment of an in-order architecture core and an exemplary register renaming, out-of-order issue/execution architecture core to be included in a processor according to embodiments of the invention;

FIGS. 8A-B illustrate a block diagram of a more specific exemplary in-order core architecture, which core would be one of several logic blocks (including other cores of the same type and/or different types) in a chip;

DETAILED DESCRIPTION

Figure 1:
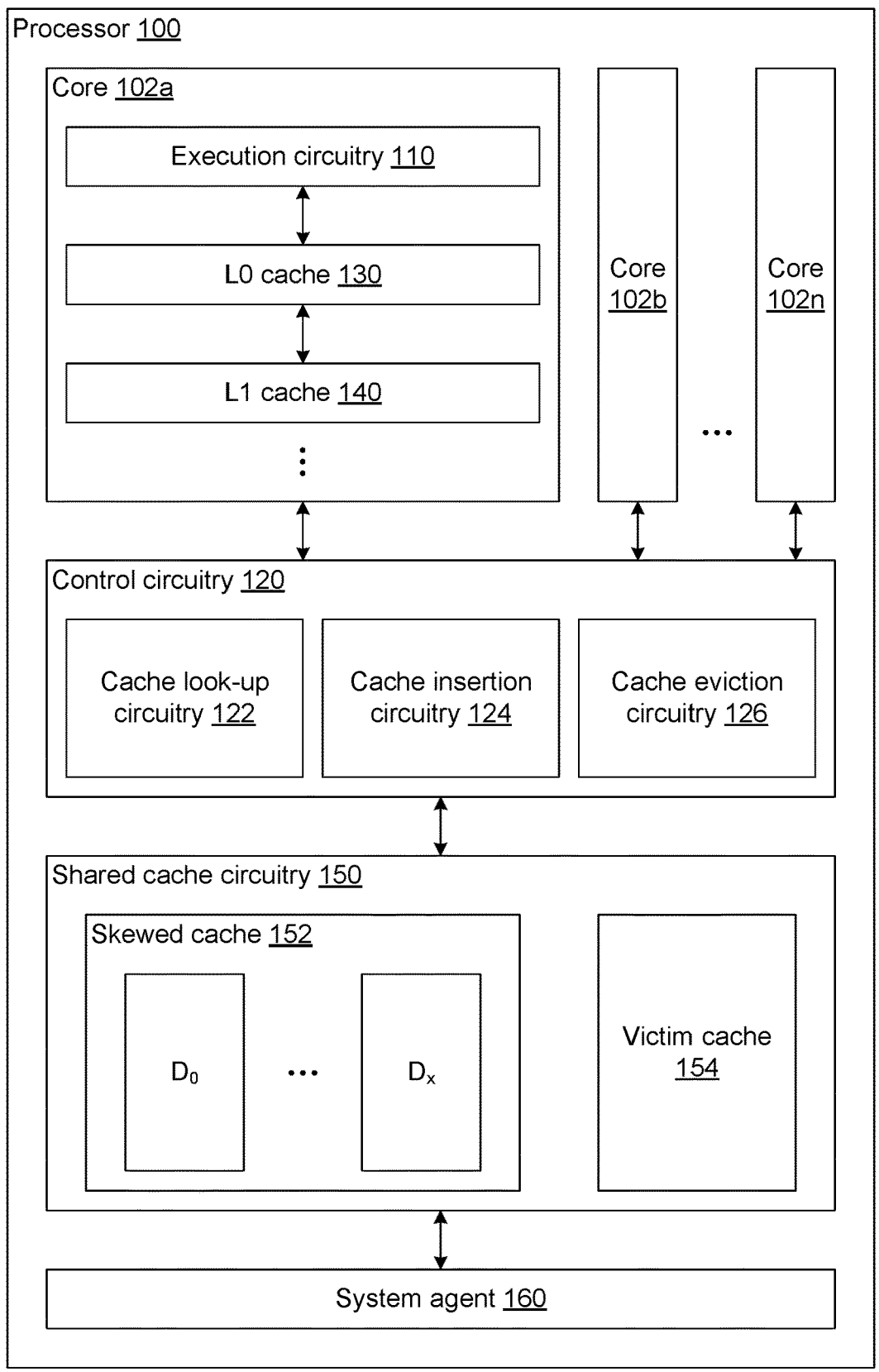
FIG. 1 illustrates a functional block diagram showing features of a system to provide protections for cache resources according to an embodiment.

Embodiments discussed herein variously provide techniques and mechanisms for a victim cache to operate in conjunction with a skewed cache to help mitigate the risk of a side-channel attack.

The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including an integrated circuit chip comprising a cache memory.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

Embodiments described herein variously supplement operation of a skewed cache with another cache (referred to herein as a "victim cache") which is to be an at least temporary repository of a line that is evicted from the skewed cache. Such a line is subject to being moved back (or "reinserted") in the skewed cache—e.g., in response to a request by an executing process to access the line.

Certain features of some embodiments are described herein with reference the use a victim cache to supplement a skewed cache which operates as a shared cache of a processor. However, in alternative embodiments, such a skewed cache instead operates as any of various other types of caches including, but not limited to, a lowest level (L0) cache, a L1 cache, a L2 cache, a cache which is external to a processor, or the like.

As used herein with respect to the storing of information at a cache, "line" refers to information which is to be so stored at a given location (e.g., by particular memory cells in a set) of that cache. As variously used herein, a label of the type "$L_K$" represents a given line which is addressable with a corresponding address labeled "K"—e.g., wherein a line $L_C$ corresponds to an address C, a line $L_V$ corresponds to an address V, a line $L_X$ corresponds to an address X, a line $L_Y$ corresponds to an address Y, etc.

As used herein, "skewed cache" refers to a cache which is partitioned into multiple divisions comprising respective ways (which, in turn, each comprise respective sets). Randomization of a skewed cache is provided, for example, by the use of (pseudo)random indexing for sets of the cache— e.g., wherein a cipher block or hash function generates indices based on address information and key values. In some embodiments, indexing of a skewed cache is regularly updated by replacing or otherwise modifying such the key values.

In some embodiments, access to a skewed cache—such as a randomized, skewed cache (RSC)—is provided with encryption functionality or hashing functionality in a memory pipeline. In one such embodiment, a set of keys is generated (e.g., randomly) upon a boot-up or other initialization process. Such a set of keys is stored for use in determining cache indices, and (for example) is to be changed at some regular—e.g., configurable—interval.

In various embodiments, an encryption scheme (or hash function) used to calculate the per-division set indices is sufficiently lightweight—as determined by implementation-specific details—to accommodate critical time constraints of cache operations. However, the encryption scheme (or hash function) should be strong enough to prevent malicious agents from easily finding addresses that have cache-set contention. QARMA, PRINCE, and SPECK are examples of some types of encryption schemes which are variously adaptable to facilitate generation of set indices in certain embodiments.

In various embodiments, the victim cache is a basic associative cache array that is to be searched (for example) in parallel with a search of the skewed cache. In one such embodiment, the skewed cache and the victim cache have substantially the same hit latency (e.g., where one such latency is within 10% of the other latency).

In an embodiment, the victim cache includes (or otherwise operates based on) controller circuitry that is able to automatically access the skewed cache to reinsert lines as described herein. Additionally or alternatively, arbitration circuitry is provided to arbitrate between use of the skewed cache for reinsertion of lines from the victim cache, and use of the skewed cache by the core.

In providing a victim cache with functionality to reinsert lines from the victim cache to a skewed cache, some embodiments make it significantly more difficult for a malicious agent to observe cache contention for the skewed cache. As a result, such embodiments enable a relatively large interval at which encryption keys (and/or other information for securing cache accesses) should be updated to effectively protect from contention-based cache attacks.

FIG. 1 shows features of a processor 100 to maintain cached data according to an embodiment. Processor 100 is one example of an embodiment wherein a victim cache functions as a repository for a line which is evicted from a randomized skewed cache, wherein said line is subject to being recached to the randomized skewed cache.

As shown in FIG. 1, processor 100 is a multicore processor including a plurality of cores 102a, 102b, ..., 102n (generically core 102). Although described herein with reference to providing cache functionality with a multicore processor, some embodiments are not limited in this regard, and such embodiments apply equally to single core processors, as well as to any of a various state machines and/or other circuit components which are operable to access a cache memory. In general, each core of the processor includes execution circuitry 110 which (for example) generally takes the form of a processor pipeline including a plurality of stages including one or more front end units, one or more execution units, and one or more backend units. In different implementations, processor 100 is an in-order processor or, alternatively, an out-of-order processor.

A given core 102 supports one or more instructions sets such as the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif., a RISC-V instruction set, or the like. It should be understood that, in some embodiments, a core 102 supports multithreading— i.e., executing two or more parallel sets of operations or threads—and (for example) does so in any of a variety of ways including time sliced multithreading, simultaneous multithreading (where a single physical core provides a logical core for each of the threads that physical core is simultaneously multithreading), or a combination thereof (e.g., time sliced fetching and decoding combined with simultaneous multithreading thereafter such as in the Intel® Hyperthreading technology).

In one example embodiment, processor 100 is a general-purpose processor, such as a Core™ i3, i5, i7, 2 Duo and Quad, Xeon™, Itanium™, XScale™ or StrongARM™ processor, which are available from Intel Corporation, of Santa Clara, Calif. Alternatively, processor 100 is from another company, such as ARM Holdings, Ltd, MIPS, etc. In other embodiments, processor 100 is a special-purpose processor, such as, for example, a network or communication processor, compression engine, graphics processor, co-processor, embedded processor, or the like. In various embodiments, processor 100 is implemented on one or more chips. Alternatively, or in addition, processor 100 is a part of and/or implemented on one or more substrates using any of a number of process technologies, such as, for example, BiCMOS, CMOS, or NMOS. In some embodiments, a system on a chip (SoC) includes processor 100.

In general, execution circuitry 110 operates to fetch instructions, decode the instructions, execute the instructions and retire the instructions. In one such embodiment, some of these instructions—e.g., including user-level instructions or privileged level instructions—are encoded to allocate data or instructions into a cache, and/or to access the cache to read said data or instructions.

Processor 100 comprises one or more levels of cache— e.g., wherein some or all of cores 102a, 102b, ..., 102n each include a respective one or more cache levels, and (for example) wherein one or more caches of processor 100 are shared by various ones of cores 102a, 102b, ..., 102n. In the illustrative embodiment shown, core 102a comprises a lowest level (L0) cache 130, and a next higher level of cache, namely a level 1 (L1) cache 140 which is coupled to L0 cache 130. In turn, cores 102a, 102b, ..., 102n are each coupled to shared cache circuitry 150 that in turn is coupled to a system agent 160, also referred to as uncore circuitry, which can include various components of a processor such as power control circuitry, memory controller circuitry, interfaces to off-chip components and the like. Although shown at this high level in the embodiment of FIG. 1, understand the scope of the present invention is not limited in this regard.

As seen in FIG. 1, cores 102a, 102b, 102n are variously coupled to control circuitry 120 which, for example, comprises a cache controller or other control logic to control storage and retrieval operations with regard to cache circuitry, such as the illustrative shared cache circuitry 150 shown. In the example embodiment of FIG. 1, victim cache functionality is provided to promote the security of a shared (or other) cache processor 100, as shown by shared cache circuitry 150. However, in other embodiments, victim cache functionality is additionally or alternatively used to enhance the security of a L0 cache, a L1 cache, a L2, cache, a last level cache, and/or any of various other types of caches which, for example, reside in (or alternatively, are to be coupled to) a processor.

In one example embodiment, shared cache circuitry 150 comprises memory regions to provide respective caches 152, 154—e.g., wherein cache 154 is to function as a victim cache for cache 152. In an embodiment, control circuitry 120 and shared cache circuitry 150 operate to provide a partitioning of cache 152—e.g., where such partitioning facilitates operation of cache 152 as a skewed cache. For example, control circuitry 120 provides functionality to partition cache 152 into multiple divisions—e.g., including the illustrative divisions $D_0$, $D_1$ shown—which are variously arranged into respective columns (or "ways"), which in turn each comprise respective sets. The various way of cache 152 provide multiple respective degrees of set associativity. To help protect side-channel attacks which target cache 152, control circuitry 120 operates cache 154, in some embodiments, as a repository to receive lines which are evicted from cache 152. In one such embodiment, a given one of said lines is subsequently evicted from cache 154 for reinsertion into cache 152.

For example, cache look-up circuitry 122 of control circuitry 120 illustrates any of a variety of one or more of microcontrollers, application-specific integrated circuits (ASICs), state machines, programmable gate arrays, mode registers, fuses, and/or other suitable circuit resources which are configured to identify a particular location—at one of caches 152, 154—to which (or from which) a given line is to be cached, read, evicted, reinserted or otherwise accessed. In one such embodiment, cache look-up circuitry 122 performs a calculation, look-up or other operation to identify an index for the cache location—e.g., based on an address which has been identified as corresponding to a given line. For example, the index is determined based on an encryption (or hash) operation which uses the address. In some embodiments, cache look-up circuitry 122 also provides functionality to provide at least some further randomization with respect to how cache locations are each to correspond to a respective index, and/or with respect to how lines are each to be stored to a respective cache location. In one such embodiment, cache look-up circuitry 122 further supports a regular updating of indices which are to be used to access cache 152—e.g., wherein cache look-up circuitry 122 updates encryption keys or hash functions which are variously used to determine said indices. In various embodiments, cache look-up circuitry 122 performs one or more operations which, for example, are adapted from conventional techniques for partitioning, accessing or otherwise operating a skewed cache (such as a randomized skewed cache).

Cache insertion circuitry 124 of control circuitry 120 illustrates any of a variety of one or more of microcontrollers, ASICs, state machines, programmable gate arrays, mode registers, fuses, and/or other suitable circuit resources which are configured to store a given line into a location of one of caches 152, 154. For example, cache insertion circuitry 124 operates (e.g., in conjunction with cache look-up circuitry 122) to identify a location at cache 152 which is to receive a line which is to be evicted from cache 154 or, for example, a line which is retrieved from an external memory (not shown) that is to be coupled to processor 100. Alternatively or in addition, cache insertion circuitry 124 operates to identify a location at cache 154 which is to receive a line which is to be evicted from cache 152, for example. In various embodiments, cache insertion circuitry 124 performs one or more operations which are adapted from conventional techniques for storing lines to a cache.

Cache eviction circuitry 126 of control circuitry 120 illustrates any of a variety of one or more of microcontrollers, ASICs, state machines, programmable gate arrays, mode registers, fuses, and/or other suitable circuit resources which are configured to evict a line from one of caches 152, 154. For example, cache eviction circuitry 126 operates—e.g., in conjunction with cache look-up circuitry 122—to identify a location at cache 152 which stores a line to be evicted to cache 154 (or, for example, to be evicted to an external memory). Alternatively or in addition, cache eviction circuitry 126 operates to identify a location at cache 154 which stores a line to be evicted to cache 152, for example. In various embodiments, cache eviction circuitry 126 performs one or more operations which are adapted from conventional techniques for evicting lines from a cache.

In an illustrative scenario according to one embodiment, cache 152 is operated as a skewed cache which comprises $N=(s \cdot w)$ lines (where the integer s is a number of sets, and the integer w is a number of ways). For example, the N lines are organized into d divisions by grouping together w/d ways in each division (wherein $1 \le d \le w$, and wherein $1 \le w/d \le w$). Cache 152 is skewed by such divisions—e.g., wherein indices are used to variously select corresponding sets each in a different respective one of the d division. Such indices are variously derived (for example) using a block cipher, or a keyed hash function within the memory pipeline.

By way of illustration and not limitation, in some embodiments, a look-up operation to access a given set of cache 152 comprises cache look-up circuitry 122 obtaining d differently encrypted (or, for example, hashed) values $C_{enc,0}$, $C_{enc,1}$, ..., $C_{enc,d-1}$ each based on an address C and a different respective key. In one such embodiment, for a line $L_C$ of data which corresponds to the address C, d different encryptions of the address C are performed by cache look-up circuitry 122, where each such encryption is based on a block cipher E and on a different respective one of d keys $K_0$, $K_1$, ..., $K_{d-1}$. Alternatively, d different hashes of the address C are calculated by cache look-up circuitry 122, each based on a hash function H and on a different respective one of the d keys $K_0$, $K_1$, ..., $K_{d-1}$. Subsequently, d different indices $idx_0$, $idx_1$, ..., $idx_{d-1}$ are determined—e.g., by identifying, for each of the d encrypted (or hashed) address values $C_{enc,0}$, $C_{enc,1}$, ..., $C_{enc,d-1}$, a respective slice of $\log_2 s$ bits.

In one such embodiment, accessing cache 152 comprises cache look-up circuitry 122 performing lookups in each of d sets—e.g., in parallel with each other—to determine if a given line $L_C$ corresponding to the indicated address C can be found. If line $L_C$ is not found by said lookups, cache insertion circuitry 124 chooses one of the d sets (for example, at randomly) for inserting the line $L_C$. Any of a variety of replacement algorithm can be used—e.g., according to conventional cache management techniques—to store the line $L_C$ within the chosen set. Typically, since a pseudorandom mapping of an address C to indices $idx_0$, $idx_1$, ..., $idx_{d-1}$ is at risk of being learned over time by a malicious agent, the keys $K_0$, $K_1$, ..., $K_{d-1}$ should be updated regularly to mitigate the risk of contention-based (or other) side-channel attacks.

Various features of processor 100 described herein help reduce the risk of side-channel attacks which target a skewed cache. For example, fine-grained contention-based cache attacks exploit contention in cache sets, wherein malicious agents typically need some minimal set of addresses that map to the same cache set (a so-called eviction set) as the victim address of interest. Skewed caches (for example, randomized skewed caches) significantly increase the complexity of finding such eviction sets, due to the use of a pseudo-random address-to-set mapping and cache skewing. Namely, addresses that collide with a victim address in all d divisions are very unlikely—i.e., $s^{-d}$—forcing a malicious agent to use more likely partial collisions. Such partially conflicting addresses collide with the victim, e.g., in a single division only, but also have smaller probability to evict the victim address (or observe a victim access), i.e., $d^{-2}$ if an address collides with the victim address in a single division.

One technique for side-channel attacks to find partially conflicting addresses includes (1) priming a cache with a set of candidate attacker addresses, (2) removing candidate addresses that miss in the cache (pruning step), (3) triggering the victim to access the address of interest, and (4) probing the remaining set of candidate addresses. A candidate address missing in the cache has a conflict with the victim in at least one division. While this interactive profiling technique does not break skewed caches entirely, it demands that keys be refreshed at relatively high rates, which impacts system performance.

To mitigate the threat and/or impact of these attacks, some embodiments variously provide a type of cache—referred to herein as a reinserting victim cache (VC) or, for brevity, simply "VC"—which is available for use, in combination with a skewed cache, such as a randomized skewed cache (RSC). In one such embodiment, a given line which is evicted from a skewed cache is put into a VC. Subsequently, said line is reinserted into the skewed cache—e.g., by swapping lines between respective entries of the skewed cache and the VC. Benefits variously provided by such embodiments include, but are not limited to, an increased effective amount of cache associativity, a reduced observability of cache contention, a decoupling of actual evictions from cache-set contention, and increased side-channel security at longer re-keying intervals. Some embodiments variously provide cache randomization functionality in combination with cache skewing to improve security against contention-based cache attacks (where, for example, use of a victim cache enables a reduction to a rate of key refreshes).

For example, in various embodiments, cache eviction circuitry 126 (for example) variously evicts lines from the cache 152 over time, and puts them into cache 154. In one such embodiment, cache insertion circuitry 124 variously reinserts some or all such evicted lines into the cache 152 at different times. For example, when there is a hit for a line in cache 154, that line is automatically evicted from cache 154 by cache eviction circuitry 126, and reinserted into cache 152 by cache insertion circuitry 124. In one such embodiment, control circuitry 120 maintains two indices $\text{idx}_{VC,insert}$ and $\text{idx}_{VC,reinsert}$ which identify (respectively) an item that has been most recently inserted into cache 154, and an item that has been most recently reinserted into cache 152. In providing a VC with cache management functionality that automatic reinserts lines from cache 154 to cache 152, some embodiments variously hide contention in cache 152 by decoupling evictions in cache 154 from evictions in cache 152.

Figure 2:
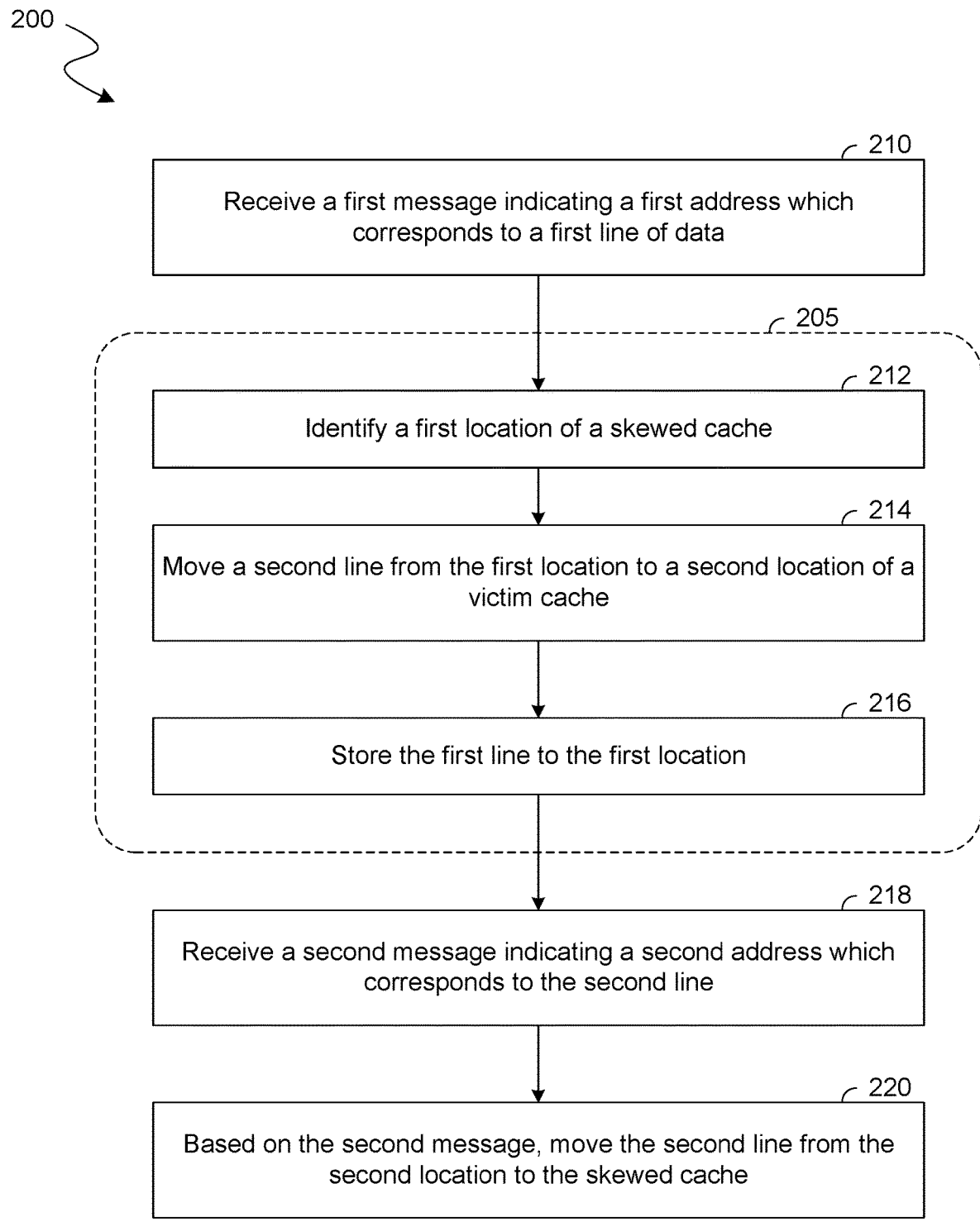
FIG. 2 illustrates a flow diagram showing features of a method to operate cache memory resources according to an embodiment.

FIG. 2 shows features of a method 200 to operate a cache memory system according to an embodiment. Method 200 illustrates one embodiment wherein a line is evicted from a skewed cache (such as a randomized skewed cache) to a victim cache, and subsequently reinserted from the victim cache to the skewed cache in response to a request to access the line. Performance of method 200 is provided with functionality such as that of processor 100, for example.

As shown in FIG. 2, method 200 comprises (at 210) receiving a first message indicating a first address which corresponds to a first line of data. In one illustrative embodiment, the first message is received by control circuitry 120 based on an execution of software process with execution circuitry 110. The first message is, for example, a request to search for the first line in a skewed cache and a second cache (e.g., in caches 152, 154, respectively), where the second cache is to function as a victim cache with respect to the skewed cache. Alternatively, the first message is a request to cache the first line (where, for example, the first line has already been retrieved from some memory that is external to processor 100).

Method 200 further comprises operations 205 which are performed based on the first message which is received at 210. In an embodiment, operations 205 comprise (at 212) identifying a first location of a skewed cache—e.g., wherein cache look-up circuitry 122 performs one or more operations to identify a set of the skewed cache which has been mapped to the indicated first address. For example, cache look-up circuitry 122 performs a look-up, encryption, hash or other operation to identify one of multiple indices which are based on the first address, and which each correspond to a different respective set of the skewed cache.

In some embodiments, the skewed cache is operated as a random skewed cache. For example, the first location is identified at 212 based on a selected one of first indices which are determined—by cache look-up circuitry 122 (or other suitable cache controller logic)—based on the first address and a first plurality of key values. The first indices—generated using a cipher block or hash function, for example—each correspond to a different respective one of multiple sets of the skewed cache (e.g., where the sets are each in a different respective division of the skewed cache). At some other time, access to the multiple sets is instead provided with second indices which are determined based on the first address and a second plurality of alternative key values—e.g., wherein control circuitry 120 changes indexing of the skewed cache to help protect from side-channel (or other) attacks.

Operations 205 further comprise (at 214) moving a second line from the first location to a second location of a second cache, which is provided as a victim cache for lines evicted from the skewed cache. For example, moving the second line to the second location at 214 is based on cache insertion circuitry 124 (or other suitable cache controller logic) detecting a valid state of the second line. For example, in some embodiments, operations 205 further comprise evicting a third line from the second location to a memory (e.g., an external memory which is coupled to processor 100) before moving the second line from the first location to the second location. In one such embodiment, evicting the third line is based on cache insertion circuitry 124 (or other suitable cache controller logic) detecting a valid state of the third line. Operations 205 further comprise (at 216) storing the first line to the first location, which (for example) is available after the moving at 214.

In an embodiment, method 200 further comprises (at 218) receiving a second message indicating a second address which corresponds to the second line. The second message (e.g., received by control circuitry 120) is, for example, a request to search for the second line in the skewed cache and the second cache. Based on the second message received at 218, method 200 (at 220) moves the second line from the second location to the skewed cache. In one such embodiment, moving the second line at 220 comprises swapping the second line and a third line between the skewed cache and the second cache—e.g., based on the detecting of a valid state of the third line. In an alternative scenario (e.g., wherein the third line is invalid), the moving at 220 simply writes over the third line in the skewed cache.

Figure 3:
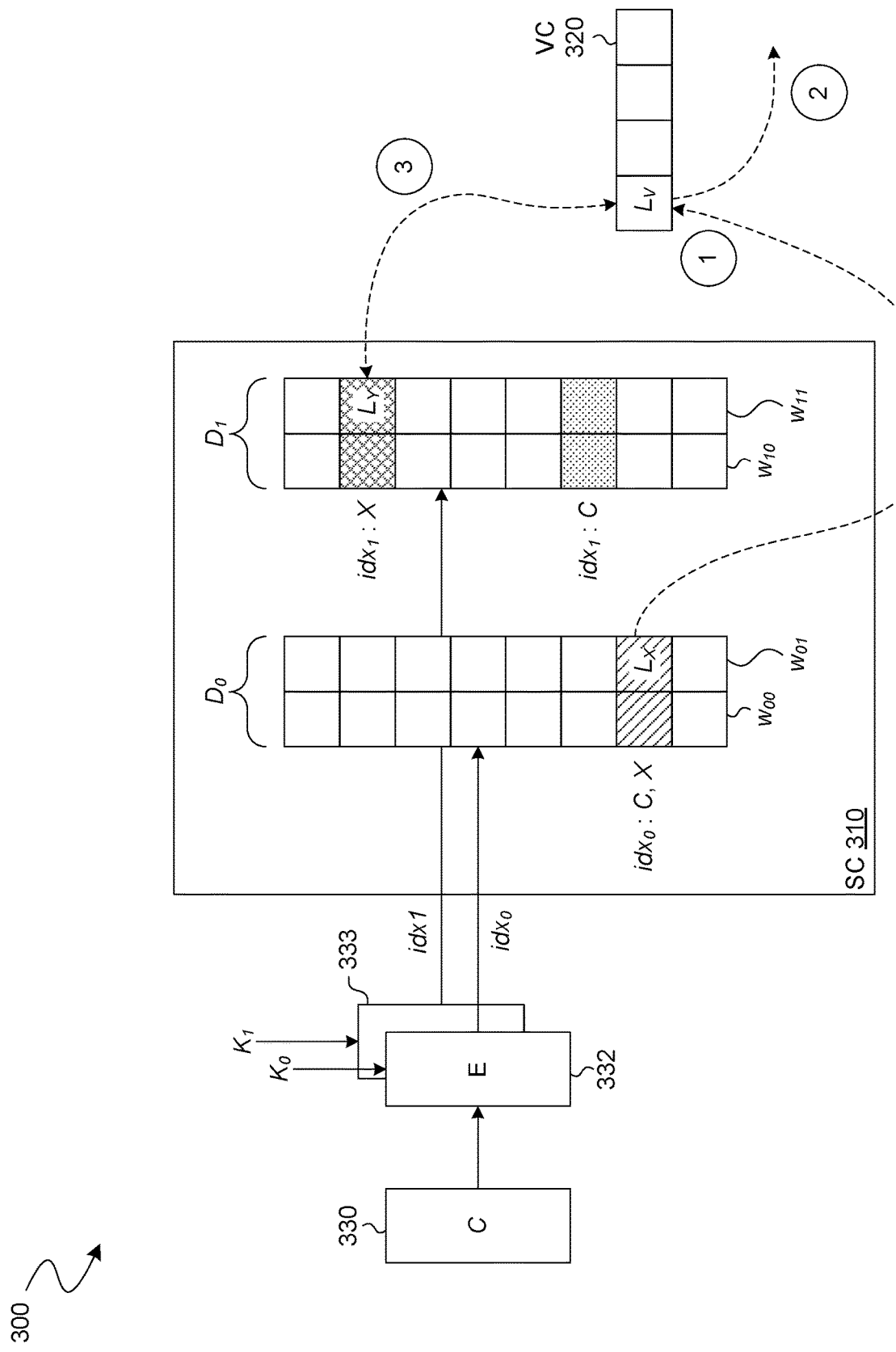
FIG. 3 illustrates a functional block diagram showing features of a system to move a line between caches according to an embodiment.

FIG. 3 shows operations performed by a system 300 to manage memory caches according to an embodiment. In various embodiments, system 300 includes features of processor 100—e.g., wherein functionality such as that of system 300 is provided according to method 200.

As shown in FIG. 3, system 300 comprises a skewed cache (SC) 310 and a victim cache VC 320 which, for example, correspond functionally to caches 152, 154 (respectively). In the illustrated embodiment, SC 310 comprises $N=(s \cdot w)$ lines (where the number of sets s is equal to 8, the number of ways w is equal to 4, and the number of lines N is equal to 32), which are divided into d=2 divisions. Furthermore, VC 320 comprises $w_{VC}$ ways (where $w_{VC}$ is equal to 4).

In an example scenario according to one embodiment, system 300 receives or otherwise communicates a request 330 which provides an address C to indicate, at least in part, that a line $L_C$ corresponding to the address C is to be cached, read, evicted, or otherwise accessed. For example, request 330 is communicated by execution circuitry 110 to control circuitry 120 to determine whether either of caches 152, 154 stores some cached version of line $L_C$.

In one such embodiment, the address C is mapped (e.g., by circuit blocks 332, 333 provided, for example, with cache look-up circuitry 122) to multiple sets of SC 310, where each such set at a different respective division of SC 310. Such mapping is based, for example, on a cipher E (or alternatively, based on a hash functions H) and a set of keys including, for example, the illustrative keys $K_0$, $K_1$ shown. Based on a request for the line $L_C$, a look up operation is performed to see if VC 320, or any of the mapped sets in SC 310, includes the line $L_C$. Where the line $L_C$ is found in SC 310, said line $L_C$ is simply returned in a response to the request. However, where the line $L_C$ is found in VC 320, said line $L_C$—in addition to being returned in response to the request—is also evicted from VC 320 and reinserted into SC 310 (e.g., at one of those sets of SC 310 which are mapped to the address C).

In an embodiment, if reinsertion of line $L_C$ from VC 320 to SC 310 conflicts with some other line which is currently in SC 310, then that other line is swapped with the line $L_C$—e.g., wherein the line $L_C$ is inserted into the location where SC 310 stored the other line, and where that other line is evicted to the location where VC 320 stored the line $L_C$.

If the request for the line $L_C$ misses—that is, where neither of SC 310 or VC 320 currently has line $L_C$—then the line $L_C$ is fetched from an external memory (not shown) and, for example is inserted into one of the sets of SC 310—e.g., as determined based on the address C and a cipher E (or a hash function H, for example). If an insertion of the line $L_C$ conflicts with some second line $L_X$ which is currently stored in SC 310, then that second line $L_X$ is evicted from SC 310 to VC 320. In some cases, such eviction of the line $L_X$ from SC 310 to VC 320 results in eviction of some third line $L_Y$ from VC 320 to memory. In some embodiments, reinsertion of a given line from a victim cache to a skewed cache comprises the cache management circuitry trying to reinsert the line into a different cache way (and, for example, a different division) other than the one from which the line was originally evicted.

In various embodiments, use of VC 320 with SC 310 hinders some side-channel attacks by breaking the direct observability of cache-set contention. In an illustrative scenario according to one embodiment, an attacker uses a line $L_X$ which corresponds to an attacker address X that conflicts with an address C for a line $L_C$. Servicing of a request for line $L_C$ results in the line $L_X$ being evicted from SC 310 into VC 320, which in turn results in an eviction of another line $L_Y$ from VC 320 into memory (as indicated by the line transfer operations labeled "1" and "2" in FIG. 3). Such eviction of line $L_Y$ to memory would contribute to a cache miss by some later request for line $L_Y$—e.g., where a malicious agent is probing for such misses as part of a side-channel attack. However, this miss would not be detected as being related to the cache-set contention between lines $L_X$, $L_C$ in SC 310, where (for example) the attacker line $L_X$ is subsequently reinserted into SC 310

For example, in a first example situation, a later request for line $L_X$ would result in line $L_X$ being reinserted from VC 320 back into the same division where it was originally stored in SC 310. This would result in the line $L_C$ (corresponding to address C) being selected for eviction to VC 320, i.e., wherein line $L_X$ and the line $L_C$ are swapped. As a result, line $L_X$ and the line $L_C$ are stored in SC 310 and VC 320 (respectively), making the previous contention in SC 310 invisible.

In a second example situation, the line $L_X$ is instead reinserted from VC 320 into a division of SC 310 other than the one from which it was previously evicted. As a result, the line $L_C$ is not selected for eviction from SC 310—e.g., where (for example) some other line $L_Y$, previously stored in SC 310, is instead swapped with the line $L_X$ (as indicated by the line swap operation labeled "3" in FIG. 3). If line $L_Y$ is invalid, the previous contention in SC 310 becomes invisible. If line $L_Y$ is valid, a malicious agent could conceivably be able to observe a miss on line $L_Y$ if (for example) it manages to flush VC 320.

Evictions observed by a malicious agent thus appear to be unrelated to the victim address C, or to have an only indirect relationship to the victim address. An indirectly contending address Y might arise in the following situation: line $L_Y$ evicts line $L_X$, and then line $L_X$ evicts line $L_C$. Hence, line $L_X$ contends with both line $L_Y$ and line $L_C$, depending on the division. Indirectly contending addresses like Y remain sufficiently hard to exploit in practice for multiple reasons. For example, malicious agents cannot distinguish whether they sampled such indirectly contending address, or an unrelated one. This aspect effectively increases the number of addresses required in the eviction set.

Furthermore, malicious agents typically do not know what the address X is, because it cannot be observed. However, an indirectly contending address Y is only valuable to malicious agent if they know address X and insert line $L_X$ before beforehand—i.e., line $L_X$ is a required proxy for line $L_Y$ to evict line $L_C$. Other addresses are unlikely to contribute this this kind of multi-collision—i.e., it is unlikely for many addresses X' to contend with both address C and address Y in different divisions. In general, there is roughly a probability of $w^2 s^{-2}$ (e.g., 1 in 4096 addresses for a cache with 1024 sets and 16 ways) that some address would have this property.

There is a special case where lines $L_X$, $L_Y$ collide with line $L_C$ in the same division (which can occur, for example, where d<w). In one such situation, line $L_Y$ could directly evict line $L_C$ from SC 310, but where VC 320 triggers automatic reinsertion of line $L_C$ (effectively preventing eviction).

Further still, even if malicious agents know address X, they have low probability of evicting the victim line $L_C$ from SC 310. For example, line $L_C$ and line $L_X$ must both have been placed in the correct cache ways beforehand, line $L_Y$ must be inserted so as to evict line $L_X$, and line $L_X$ must be reinserted so as to evict line $L_C$ to VC 320. In general, such a sequence for line placements has a probability of roughly $w^{-4}$. This significantly increases the number of addresses needed in the eviction set to obtain a good eviction probability.

Further still, the malicious agent would typically need to flush VC 320 with lines for random addresses once line $L_C$ was evicted from SC 310 into VC 320. This process requires additional contention in SC 310 and adds "noise" to the probing process of a side-channel attack.

Figure 4:
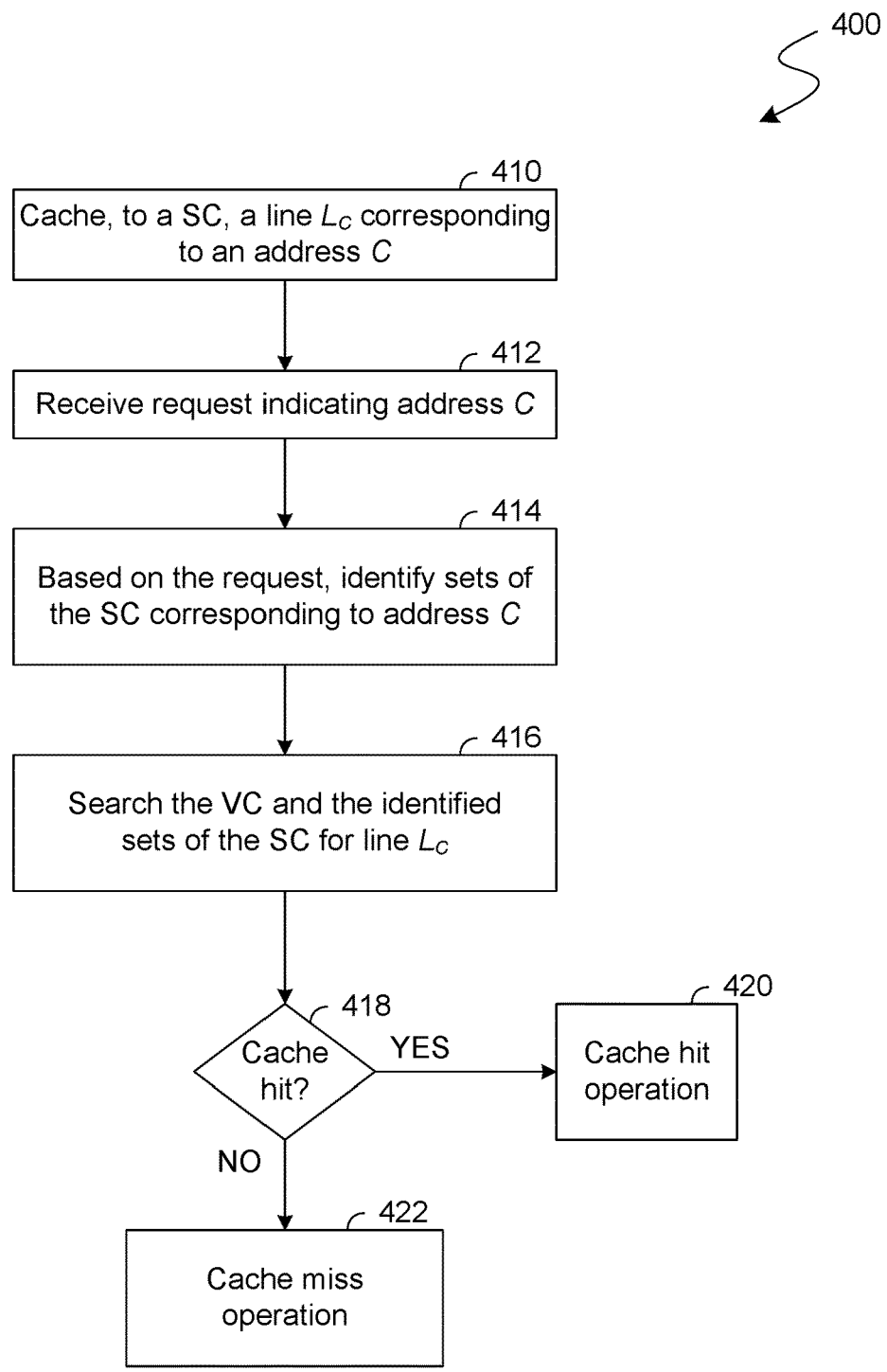
FIG. 4 illustrates a flow diagram showing features of a method to service a data access request according to an embodiment.

FIG. 4 shows features of a method 400 to move lines of data between different memory caches according to an embodiment. In some embodiments, performance of method 400 is provided with functionality such as that of processor 100—e.g., wherein method 400 includes or is otherwise based on method 200.

As shown in FIG. 4, method 400 comprises (at 410) caching a line $L_C$ to a set of a skewed cache, wherein the line $L_C$ corresponds to an address C which has been mapped to that set. In an illustrative scenario according to one embodiment, an initialization of a data and/or instruction cache system (such as a cache subsystem of processor 100, or system 300) comprises invalidating all lines in a skewed cache and all lines in a victim cache (VC). Furthermore, indices $idx_{VC,insert}$ and $idx_{VC,reinsert}$ for the VC are initialized (e.g., to 0) and, for example, are configured to wrap around if they exceed some maximum value, such as ($w_{VC}-1$). Subsequently the address C, corresponding to line $L_C$, is mapped to entries of the skewed cache. By way of illustration and not limitation, encrypted address values are determined each based on the address C and a different respective one of d keys $K_0, K_1, \ldots, K_{d-1}$ (where a given encryption key $K_i$ corresponds to a particular division i of the skewed cache). Indices $idx_0, idx_1, \ldots, idx_{d-1}$ are then obtained—e.g., each by identifying a respective slice of $\log_2 s$ bits from a corresponding one of the encrypted address values (where a given set index $idx_i$ corresponds to a particular division i of the skewed cache). Said indices are available to be used each to access a respective one of the d divisions—e.g., to access any of d cache sets $S_{0,idx0}, S_{1,idx1}, \ldots, S_{d-1,idxd-1}$ (where, for a given set $S_{i,j}$, index i indicates a particular division, and index j indicates a particular set of that division i). In some embodiments, the d cache sets $S_{0,idx0}, S_{1,idx1}, \ldots, S_{d-1,idxd-1}$ comprise w/d entries each, for example.

Method 400 further comprises (at 412) receiving a request—such as the request 330 communicated with system 300—which indicates the address C, and (at 414) identifying, based on the request which is received at 412, those sets of the skewed cache which have been mapped to the address C. For example, at some point after the mapping of skewed cache sets, a request to access the line $L_C$ provides the corresponding address C, which is used by control circuitry 120 (or other suitable cache control logic) to determine the corresponding mapped sets $S_{0,idx0}, S_{1,idx1}, \ldots, S_{d-1,idxd-1}$ of the skewed cache.

Method 400 further comprises (at 416) searching the victim cache, and those sets of the skewed cache which were identified at 414, for the line $L_C$ (where said searching is based on the request received at 412). For example, look-ups of the mapped sets, and of the VC, are then performed (in parallel, for example) to search for the line $L_C$. In some embodiments, if the request hits in some mapped set $S_{i,idxi}$ of the skewed cache, then the line $L_C$ is returned in a response to the access request, and—in some embodiments—replacement bits in the set $S_{i,idxi}$ are updated. If the request hits in the VC, then a VC hit operation is performed (as described herein). If the request misses in both the VC and the skewed cache, a skewed cache insert operation is performed (as described herein).

For example, method 400 determines (at 418) whether or not the searching at 416 has resulted in a cache hit—i.e., wherein the line $L_C$ has been found in either of the skewed cache or the victim cache. Where a cache hit is detected at 418, method 400 (at 420) performs operations to access one or more lines of the skewed cache or the victim cache based on the cache hit. In various embodiments, the cache hit operations at 420 include moving one line between respective sets of the skewed cache and the victim cache. In one such embodiment, the cache hit operations at 420 further comprise moving a line between an external memory and one of the skewed cache or the victim cache. In various embodiments, cache hit operation 420 includes some or all of the method 500 shown in FIG. 5.

Where it is instead determined at 418 that no such cache hit is indicated, method 400 (at 422) performs operations to cache a line from an external memory to the skewed cache based on the detected cache miss. In various embodiments, the cache miss operations at 422 include moving another line between respective sets of the skewed cache and the victim cache. In one such embodiment, the cache miss operations at 422 further comprise moving a line between an external memory and one of the skewed cache or the victim cache. In various embodiments, cache miss operation 422 includes some or all of the method 600 shown in FIG. 6.

In various embodiments, a victim cache hit operation—in response to a data request hitting a line which is stored in a victim cache—comprises control circuitry 120 (or other suitable cache control logic) returning the line in a response to the request, and also reinserting that line into a skewed cache using a skewed cache reinsert routine. By way of illustration and not limitation, reinsertion of a line from the victim cache into the skewed cache is automatically triggered if, for example, the index $idx_{VC,reinsert}$ is less than the index $idx_{VC,insert}$. Subsequently, the index $idx_{VC,reinsert}$ is incremented or otherwise updated. In one such embodiment, reinsertion of the requested line from the victim cache into the skewed cache, includes randomly selecting or otherwise identifying a division $d^\wedge \in \{0, \ldots, d-1\}$, where a line address C corresponding to the requested line is encrypted with the respective division's key $K_{d^\wedge}$. From a resulting ciphertext $C_{enc,d^\wedge}$, $\log_2 s$ bits are sliced out to obtain index $idx_{d^\wedge}$, which is used to select the cache set $S_{d^\wedge,idxd^\wedge}$ in division $d^\wedge$. Within $S_{d^\wedge,idxd^\wedge}$, a victim line $L_X$ is selected—e.g., according to a replacement policy for the cache set. The requested line in the victim cache and line $L_X$ in the skewed cache are then swapped (e.g., if line $L_X$ is valid) and the replacement bits in $S_{d^\wedge,idxd^\wedge}$ are updated. Afterwards, the requested line, and the line $L_X$ will be in the skewed cache and the victim cache, respectively.

Figure 5:
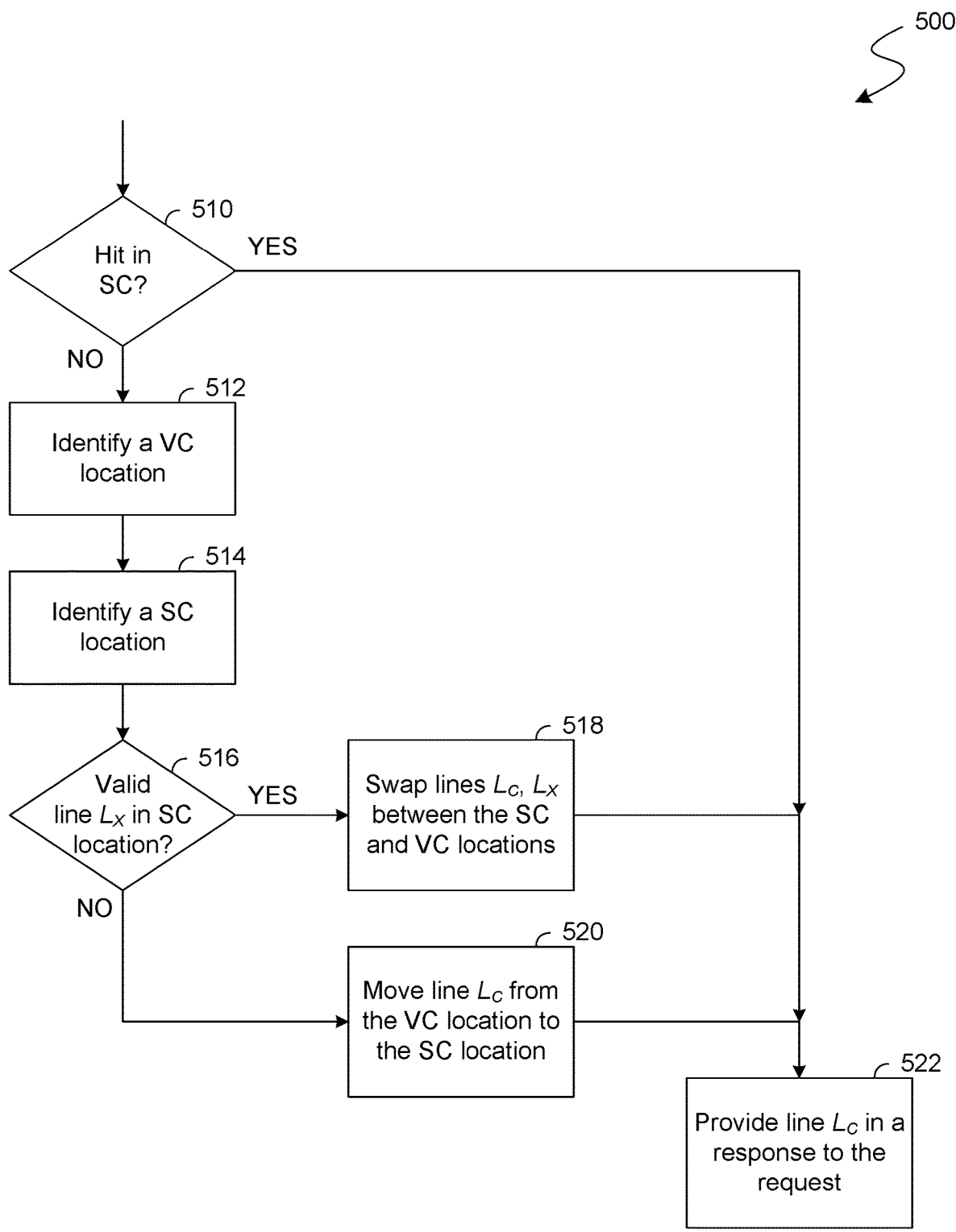
FIG. 5 illustrates a flow diagram showing features of a method to process a cache hit according to an embodiment.

For example, FIG. 5 shows features of a method 500 to operate a cache based on a cache hit according to an embodiment. Performance of method 500 is provided with functionality such as that of processor 100—e.g., wherein method 500 includes, or is performed in combination with, one or more operations of method 400. For example, the cache hit operation 420 of method 400 includes some or all of method 500, in some embodiments.

As shown in FIG. 5, method 500 comprises determining (at 510) whether or not a cache hit—such as one detected at 418—was at a skewed cache. Where it is determined at 510 that the detected cache hit was at the skewed cache (e.g., rather than at a corresponding victim cache), method 500 (at 522) provides the line $L_C$ in a response to previously-detected a request—such as the one received at 412—which indicates an address C corresponding to the line $L_C$.

By contrast, where it is instead determined at 510 that the detected cache hit was not at the skewed cache, but rather at a victim cache which corresponds to the victim cache, method 500 performs a victim cache hit process which includes (at 512) identifying the location in the victim cache from which the line $L_C$ is to be evicted. Furthermore, method 500 (at 514) identifies a location in the skewed cache which is to receive the line $L_C$ from the victim cache.

In one such embodiment, the victim cache hit process of method 500 further determines (at 516) whether or not the location which is identified at 514 currently stores any line $L_X$ which is classified as being valid. Where it is determined at 516 that the skewed cache location does currently store some valid line $L_X$, method 500 (at 518) swaps the lines $L_C$, $L_X$ between the two cache locations which are variously identified at 512 and at 514. Where it is instead determined at 516 that the skewed cache location does not currently store any valid line $L_X$, method 500 (at 520) simply moves the line $L_C$ from the location identified at 512 to the location identified at 514—e.g., wherein such moving simply writes over data stored in the location identified at 514. In either case, the victim cache hit process includes, or is performed in conjunction with, the providing of the line $L_C$ (at 522) in the response to previously-detected request which indicates the address C.

In some embodiments, a skewed cache insert process comprises fetching a line $L_C$ from a data storage device, and storing the line $L_C$ to one of the d sets $S_{0,idx0}$, $S_{1,idx1}$, ..., $S_{d-1,idxd-1}$ of the skewed cache which have been mapped to the corresponding address C. For example, one division $d\char`\^\in\{0, ..., d-1\}$ is chosen (e.g., randomly) from among the d divisions of the skewed cache, wherein a set $S_{d\char`\^, idxd\char`\^}$ of the division $d\char`\^$ is selected, and a victim line $L_X$ in the set $S_{d\char`\^,idxd\char`\^}$ is designated for eviction—e.g., according to a policy which (for example) is adapted from any of various conventional cache replacement techniques. The designated line $L_X$ is then replaced by the line $L_C$—e.g., wherein replacement bits in $S_{d\char`\^,idxd\char`\^}$ are updated accordingly. If the evicted line $L_X$ is a valid one at the time of eviction, $idx_{VC,insert}$ is incremented (or otherwise updated) and line $L_X$ is inserted into the VC at position $idx_{VC,insert}$. If some valid line $L_V$ is currently at the position $idx_{VC,insert}$ where line $L_X$ is to be inserted, then that line $L_V$ is evicted from the VC, and written to a higher level cache, to a data storage device (e.g., disk storage), or the like.

Figure 6:
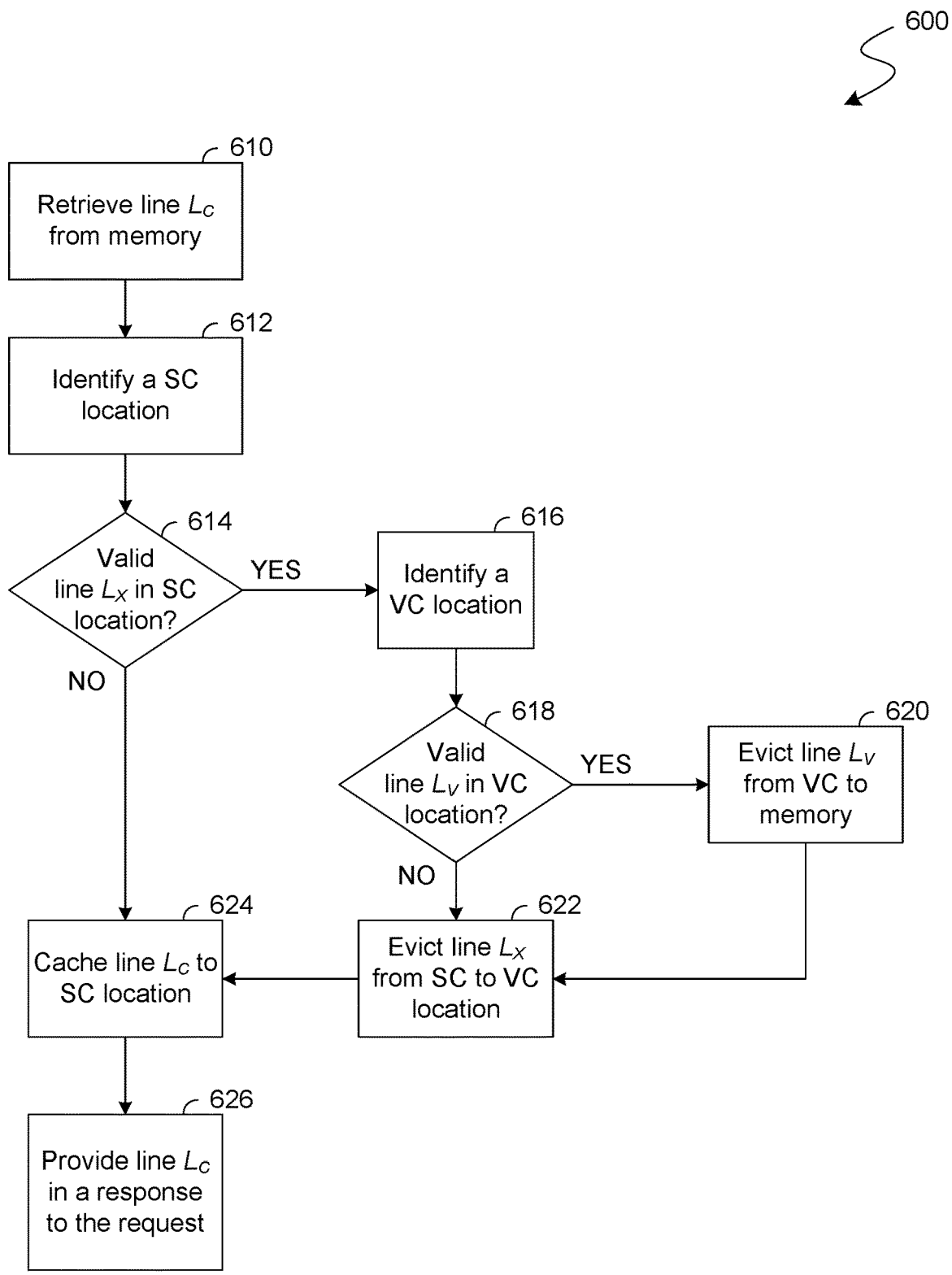
FIG. 6 illustrates a flow diagram showing features of a method to process a cache miss according to an embodiment.

For example, FIG. 6 shows features of a method 600 to operate a cache based on a cache miss according to an embodiment. In some embodiments, performance of method 600 is provided with functionality such as that of processor 100—e.g., wherein method 600 includes, or is performed in combination with, one or more operations of method 400. For example, the cache miss operation 422 of method 400 includes some or all of method 600, in some embodiments.

As shown in FIG. 6, method 600 comprises (at 610) retrieving a line $L_C$ from a data storage device (e.g., disk storage) which is external to the cache system (and for example, external to processor 100 or other such processing resources). In an embodiment, line $L_C$ is retrieved in response to a cache miss which results from a look up of both sets of a skewed cache, and of a victim cache which corresponds to that skewed cache.

A skewed cache insert process of method 600 comprises (at 612) identifying a location in the skewed cache which is to receive the line $L_C$ that is retrieved at 610. Furthermore, method 600 determines (at 614) whether or not the location which is identified at 612 currently stores any line $L_X$ which is classified as being valid. Where it is determined at 614 that the skewed cache location does currently store some valid line $L_X$, method 600 (at 616) identifies a location in the victim cache which is to receive the line $L_X$ from the skewed cache. Subsequently, the skewed cache insert process determines (at 618) whether or not the location which is identified at 616 currently stores any other line $L_V$ which is classified as being valid.

Where it is determined at 618 that the victim cache location does currently store some valid line $L_V$, method 600 (at 620) evicts the line $L_V$ from the victim cache for writing to a higher level cache, to a data storage device (e.g., disk storage), or the like. Subsequently (at 622), the line $L_X$ is evicted from the location in the skewed cache which is identified at 612, and stored at the location in the victim cache which is identified at 616. By contrast, where it is instead determined at 618 that the victim cache location does not currently store any valid line $L_V$, method 600 performs the evicting at 622, but foregoes the evicting at 620. In either case, method 600 (at 624) caches the line $L_C$ to the location which is identified at 612.

In some embodiments, where it is instead determined at 614 that the skewed cache location—which was identified at 612—does not currently store any valid line $L_X$, method 600 simply performs a caching of the line to that skewed cache location (at 624). Regardless, in some embodiments, a cache miss process includes (or is performed in conjunction with) the providing of the line $L_C$ (at 626) in a response to a previously-detected request for line $L_C$.

The figures described herein detail exemplary architectures and systems to implement embodiments of the above. In some embodiments, one or more hardware components and/or instructions described herein are emulated as detailed below, or implemented as software modules.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 7A is a block diagram illustrating both an exemplary in-order pipeline and an exemplary register renaming, out-of-order issue/execution pipeline according to embodiments of the invention. FIG. 7B is a block diagram illustrating both an exemplary embodiment of an in-order architecture core and an exemplary register renaming, out-of-order issue/execution architecture core to be included in a processor according to embodiments of the invention. The solid lined boxes in FIGS. 7A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724.

FIG. 7B shows processor core 790 including a front end unit 730 coupled to an execution engine unit 750, and both are coupled to a memory unit 770. The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit 740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 790 includes a microcode ROM or other medium that stores microcode for certain macroinstructions (e.g., in decode unit 740 or otherwise within the front end unit 730). The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 758 comprises a vector registers unit, a write mask registers unit, and a scalar registers unit. These register units may provide architectural vector registers, vector mask registers, and general purpose registers. The physical register file(s) unit(s) 758 is overlapped by the retirement unit 754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 756, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary embodiment, the memory access units 764 may include a load unit, a store address unit, and a store data unit, each of which is coupled to the data TLB unit 772 in the memory unit 770. The instruction cache unit 734 is further coupled to a level 2 (L2) cache unit 776 in the memory unit 770. The L2 cache unit 776 is coupled to one or more other levels of cache and eventually to a main memory.

By way of example, the exemplary register renaming, out-of-order issue/execution core architecture may implement the pipeline 700 as follows: 1) the instruction fetch 738 performs the fetch and length decoding stages 702 and 704; 2) the decode unit 740 performs the decode stage 706; 3) the rename/allocator unit 752 performs the allocation stage 708 and renaming stage 710; 4) the scheduler unit(s) 756 performs the schedule stage 712; 5) the physical register file(s) unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units may be involved in the exception handling stage 722; and 8) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 790 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 734/774 and a shared L2 cache unit 776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 8A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 8A is a block diagram of a single processor core, along with its connection to the on-die interconnect network 802 and with its local subset of the Level 2 (L2) cache 804, according to embodiments of the invention. In one embodiment, an instruction decoder 800 supports the x86 instruction set with a packed data instruction set extension. An L1 cache 806 allows low-latency accesses to cache memory into the scalar and vector units. While in one embodiment (to simplify the design), a scalar unit 808 and a vector unit 810 use separate register sets (respectively, scalar registers 812 and vector registers 814) and data transferred between them is written to memory and then read back in from a level 1 (L1) cache 806, alternative embodiments of the invention may use a different approach (e.g., use a single register set or include a communication path that allow data to be transferred between the two register files without being written and read back).

The local subset of the L2 cache 804 is part of a global L2 cache that is divided into separate local subsets, one per processor core. Each processor core has a direct access path to its own local subset of the L2 cache 804. Data read by a processor core is stored in its L2 cache subset 804 and can be accessed quickly, in parallel with other processor cores accessing their own local L2 cache subsets. Data written by a processor core is stored in its own L2 cache subset 804 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 8B is an expanded view of part of the processor core in FIG. 8A according to embodiments of the invention. FIG. 8B includes an L1 data cache 806A part of the L1 cache 806, as well as more detail regarding the vector unit 810 and the vector registers 814. Specifically, the vector unit 810 is a 16-wide vector processing unit (VPU) (see the 16-wide ALU 828), which executes one or more of integer, single-precision float, and double-precision float instructions. The VPU supports swizzling the register inputs with swizzle unit 820, numeric conversion with numeric convert units 822A-B, and replication with replication unit 824 on the memory input. Write mask registers 826 allow predicating resulting vector writes.

Figure 9:
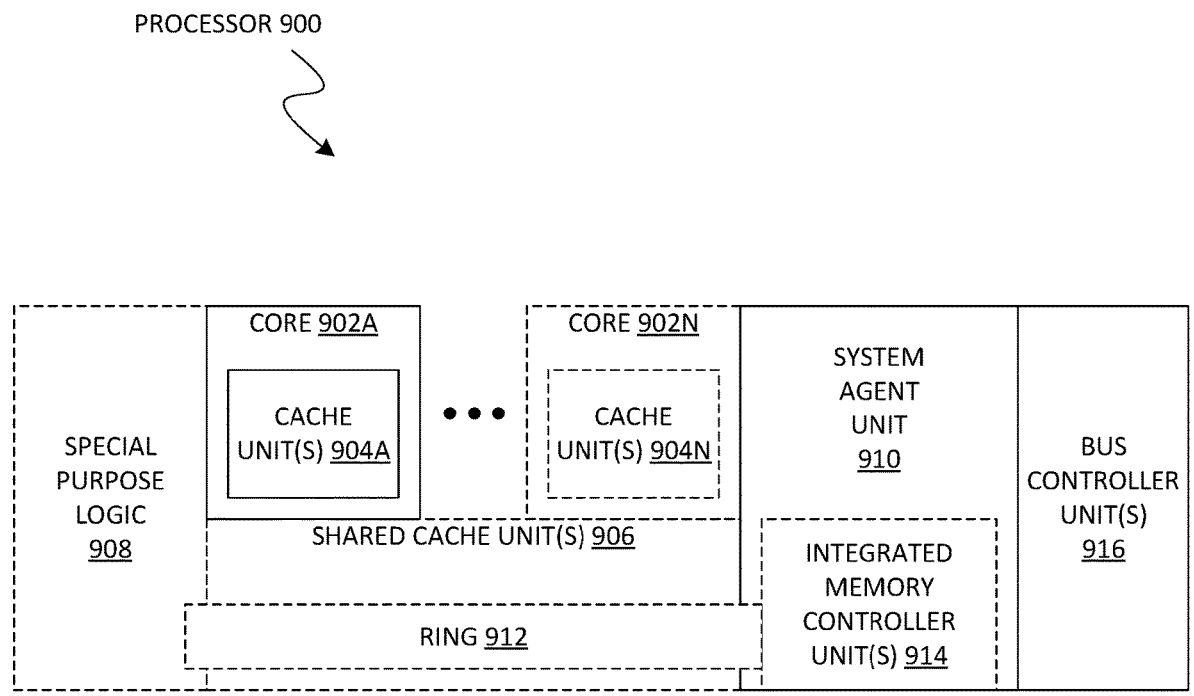
FIG. 9 is a block diagram of a processor that may have more than one core, may have an integrated memory controller, and may have integrated graphics according to embodiments of the invention.

FIG. 9 is a block diagram of a processor 900 that may have more than one core, may have an integrated memory controller, and may have integrated graphics according to embodiments of the invention. The solid lined boxes in FIG. 9 illustrate a processor 900 with a single core 902A, a system agent 910, a set of one or more bus controller units 916, while the optional addition of the dashed lined boxes illustrates an alternative processor 900 with multiple cores 902A-N, a set of one or more integrated memory controller unit(s) 914 in the system agent unit 910, and special purpose logic 908.

Thus, different implementations of the processor 900 may include: 1) a CPU with the special purpose logic 908 being integrated graphics and/or scientific (throughput) logic (which may include one or more cores), and the cores 902A-N being one or more general purpose cores (e.g., general purpose in-order cores, general purpose out-of-order cores, a combination of the two); 2) a coprocessor with the cores 902A-N being a large number of special purpose cores intended primarily for graphics and/or scientific (throughput); and 3) a coprocessor with the cores 902A-N being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, BiCMOS, CMOS, or NMOS.

The memory hierarchy includes respective one or more levels of caches 904A-N within cores 902A-N, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof. While in one embodiment a ring based interconnect unit 912 interconnects the special purpose logic 908, the set of shared cache units 906, and the system agent unit 910/integrated memory controller unit(s) 914, alternative embodiments may use any number of well-known techniques for interconnecting such units. In one embodiment, coherency is maintained between one or more cache units 906 and cores 902-A-N.

In some embodiments, one or more of the cores 902A-N are capable of multi-threading. The system agent 910 includes those components coordinating and operating cores 902A-N. The system agent unit 910 may include for example a power control unit (PCU) and a display unit. The PCU may be or include logic and components needed for regulating the power state of the cores 902A-N and the integrated graphics logic 908. The display unit is for driving one or more externally connected displays.

The cores 902A-N may be homogenous or heterogeneous in terms of architecture instruction set; that is, two or more of the cores 902A-N may be capable of execution the same instruction set, while others may be capable of executing only a subset of that instruction set or a different instruction set.

Exemplary Computer Architectures

FIGS. 10-13 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 10:
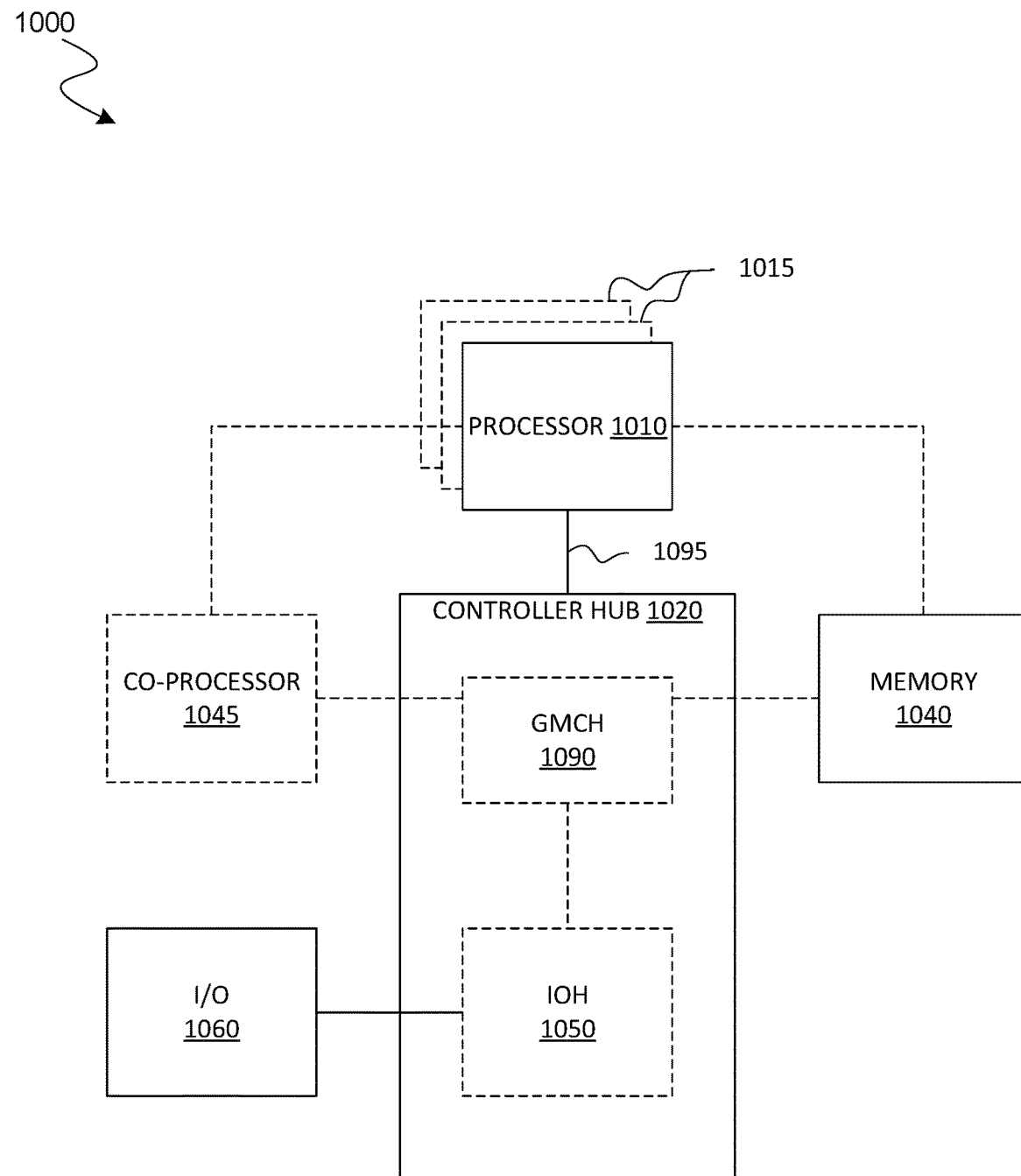
FIGS. 10-13 are block diagrams of exemplary computer architectures.

Referring now to FIG. 10, shown is a block diagram of a system 1000 in accordance with one embodiment of the present invention. The system 1000 may include one or more processors 1010, 1015, which are coupled to a controller hub 1020. In one embodiment the controller hub 1020 includes a graphics memory controller hub (GMCH) 1090 and an Input/Output Hub (IOH) 1050 (which may be on separate chips); the GMCH 1090 includes memory and graphics controllers to which are coupled memory 1040 and a coprocessor 1045; the IOH 1050 couples input/output (I/O) devices 1060 to the GMCH 1090. Alternatively, one or both of the memory and graphics controllers are integrated within the processor (as described herein), the memory 1040 and the coprocessor 1045 are coupled directly to the processor 1010, and the controller hub 1020 in a single chip with the IOH 1050.

The optional nature of additional processors 1015 is denoted in FIG. 10 with broken lines. Each processor 1010, 1015 may include one or more of the processing cores described herein and may be some version of the processor 900.

The memory 1040 may be, for example, dynamic random access memory (DRAM), phase change memory (PCM), or a combination of the two. For at least one embodiment, the controller hub 1020 communicates with the processor(s) 1010, 1015 via a multi-drop bus, such as a frontside bus (FSB), point-to-point interface such as QuickPath Interconnect (QPI), or similar connection 1095.

In one embodiment, the coprocessor 1045 is a special-purpose processor, such as, for example, a high-throughput MIC processor, a network or communication processor, compression engine, graphics processor, GPGPU, embedded processor, or the like. In one embodiment, controller hub 1020 may include an integrated graphics accelerator.

There can be a variety of differences between the processors 1010, 1015 in terms of a spectrum of metrics of merit including architectural, microarchitectural, thermal, power consumption characteristics, and the like.

In one embodiment, the processor 1010 executes instructions that control data processing operations of a general type. Embedded within the instructions may be coprocessor instructions. The processor 1010 recognizes these coprocessor instructions as being of a type that should be executed by the attached coprocessor 1045. Accordingly, the processor 1010 issues these coprocessor instructions (or control signals representing coprocessor instructions) on a coprocessor bus or other interconnect, to coprocessor 1045. Coprocessor(s) 1045 accept and execute the received coprocessor instructions.

Figure 11:
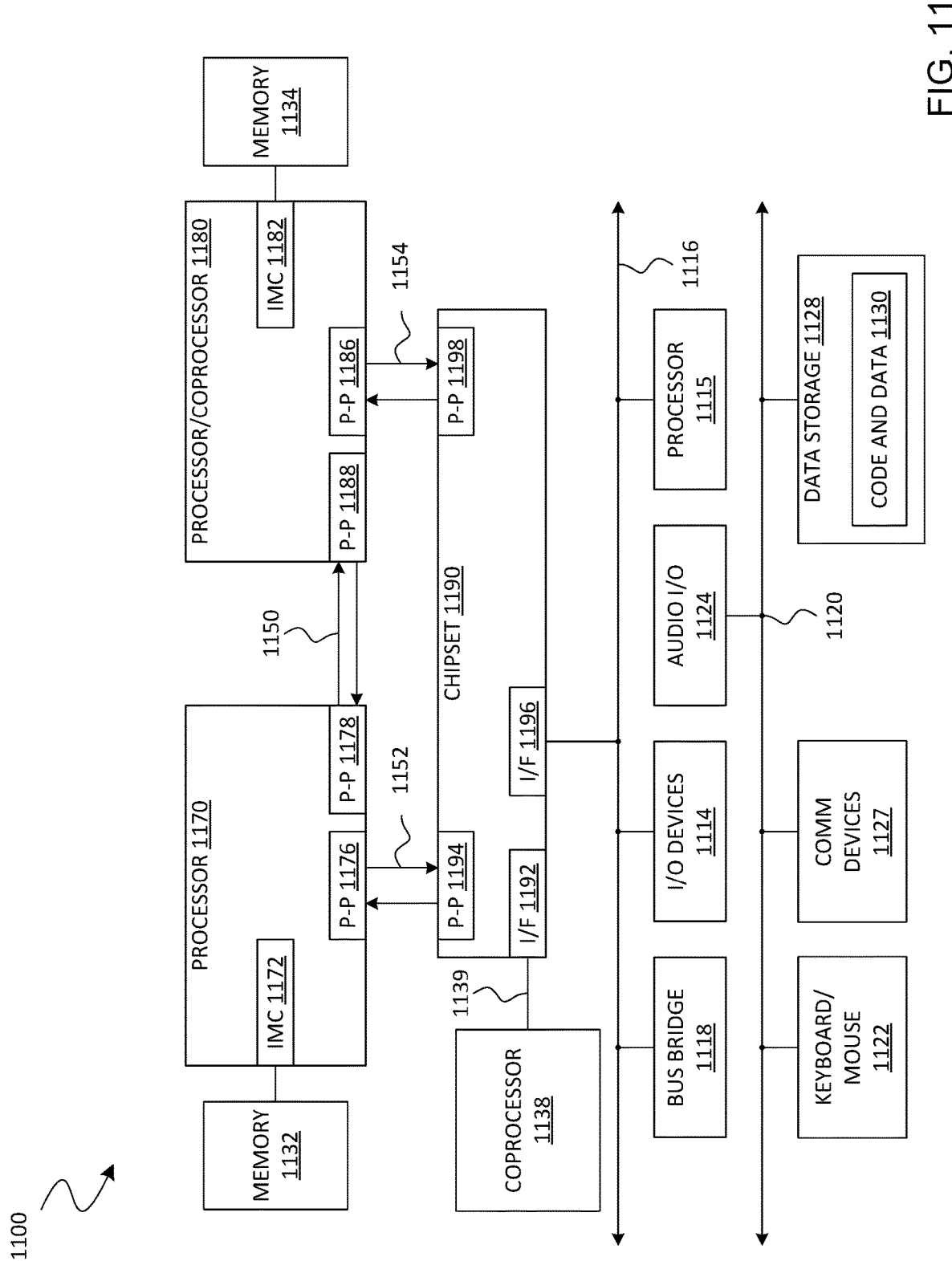

Referring now to FIG. 11, shown is a block diagram of a first more specific exemplary system 1100 in accordance with an embodiment of the present invention. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processor 900. In one embodiment of the invention, processors 1170 and 1180 are respectively processors 1010 and 1015, while coprocessor 1138 is coprocessor 1045. In another embodiment, processors 1170 and 1180 are respectively processor 1010 coprocessor 1045.

Processors 1170 and 1180 are shown including integrated memory controller (IMC) units 1172 and 1182, respectively. Processor 1170 also includes as part of its bus controller unit's point-to-point (P-P) interfaces 1176 and 1178; similarly, second processor 1180 includes P-P interfaces 1186 and 1188. Processors 1170, 1180 may exchange information via a point-to-point (P-P) interconnect 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may optionally exchange information with the coprocessor 1138 via a high-performance interface 1192 and an interconnect 1139. In one embodiment, the coprocessor 1138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present invention is not so limited.

As shown in FIG. 11, various I/O devices 1114 may be coupled to first bus 1116, along with a bus bridge 1118 which couples first bus 1116 to a second bus 1120. In one embodiment, one or more additional processor(s) 1115, such as coprocessors, high-throughput MIC processors, GPGPU's, accelerators (such as, e.g., graphics accelerators or digital signal processing (DSP) units), field programmable gate arrays, or any other processor, are coupled to first bus 1116. In one embodiment, second bus 1120 may be a low pin count (LPC) bus. Various devices may be coupled to a second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to the second bus 1120. Note that other architectures are possible. For example, instead of the point-to-point architecture of FIG. 11, a system may implement a multi-drop bus or other such architecture.

Figure 12:
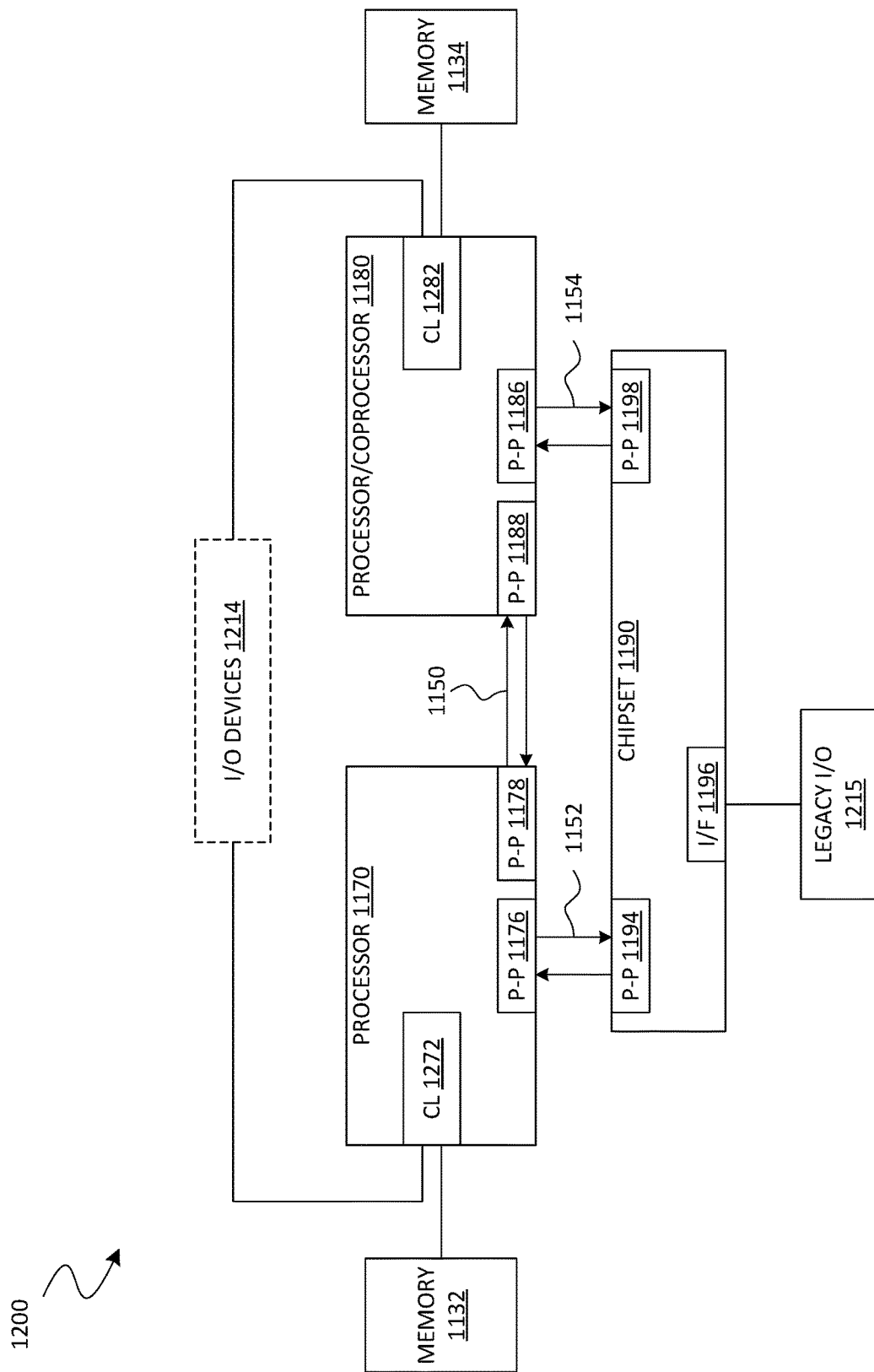

Referring now to FIG. 12, shown is a block diagram of a second more specific exemplary system 1200 in accordance with an embodiment of the present invention. Like elements in FIGS. 11 and 12 bear like reference numerals, and certain aspects of FIG. 11 have been omitted from FIG. 12 in order to avoid obscuring other aspects of FIG. 12.

FIG. 12 illustrates that the processors 1170, 1180 may include integrated memory and I/O control logic ("CL") 1272 and 1282, respectively. Thus, the CL 1272, 1282 include integrated memory controller units and include I/O control logic. FIG. 12 illustrates that not only are the memories 1132, 1134 coupled to the CL 1272, 1282, but also that I/O devices 1214 are also coupled to the control logic 1272, 1282. Legacy I/O devices 1215 are coupled to the chipset 1190.

Figure 13:
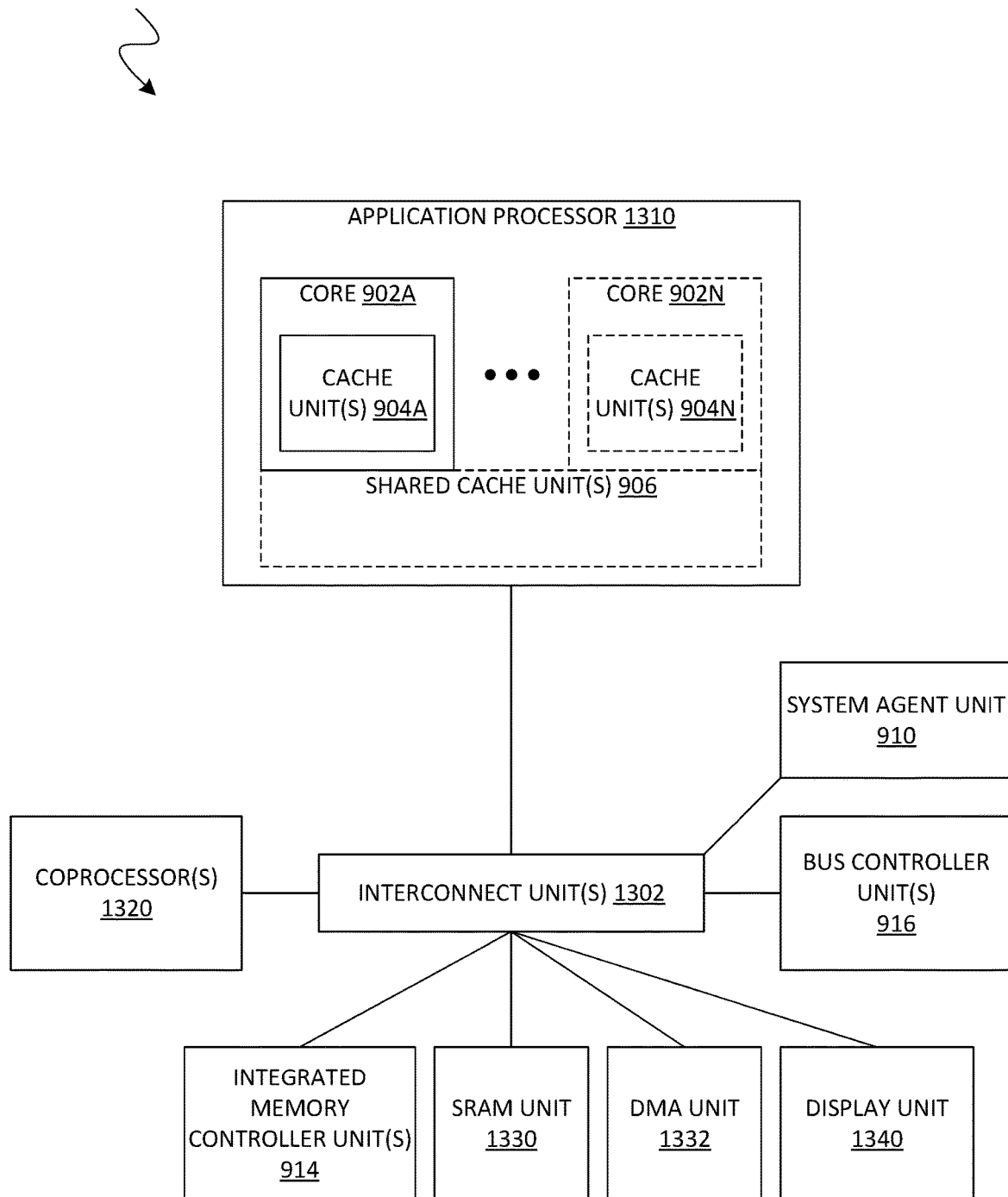

Referring now to FIG. 13, shown is a block diagram of a SoC 1300 in accordance with an embodiment of the present invention. Similar elements in FIG. 9 bear like reference numerals. Also, dashed lined boxes are optional features on more advanced SoCs. In FIG. 13, an interconnect unit(s) 1302 is coupled to: an application processor 1310 which includes a set of one or more cores 902A-N and shared cache unit(s) 906; a system agent unit 910; a bus controller unit(s) 916; an integrated memory controller unit(s) 914; a set or one or more coprocessors 1320 which may include integrated graphics logic, an image processor, an audio processor, and a video processor; an static random access memory (SRAM) unit 1330; a direct memory access (DMA) unit 1332; and a display unit 1340 for coupling to one or more external displays. In one embodiment, the coprocessor(s) 1320 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1130 illustrated in FIG. 11, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 14:
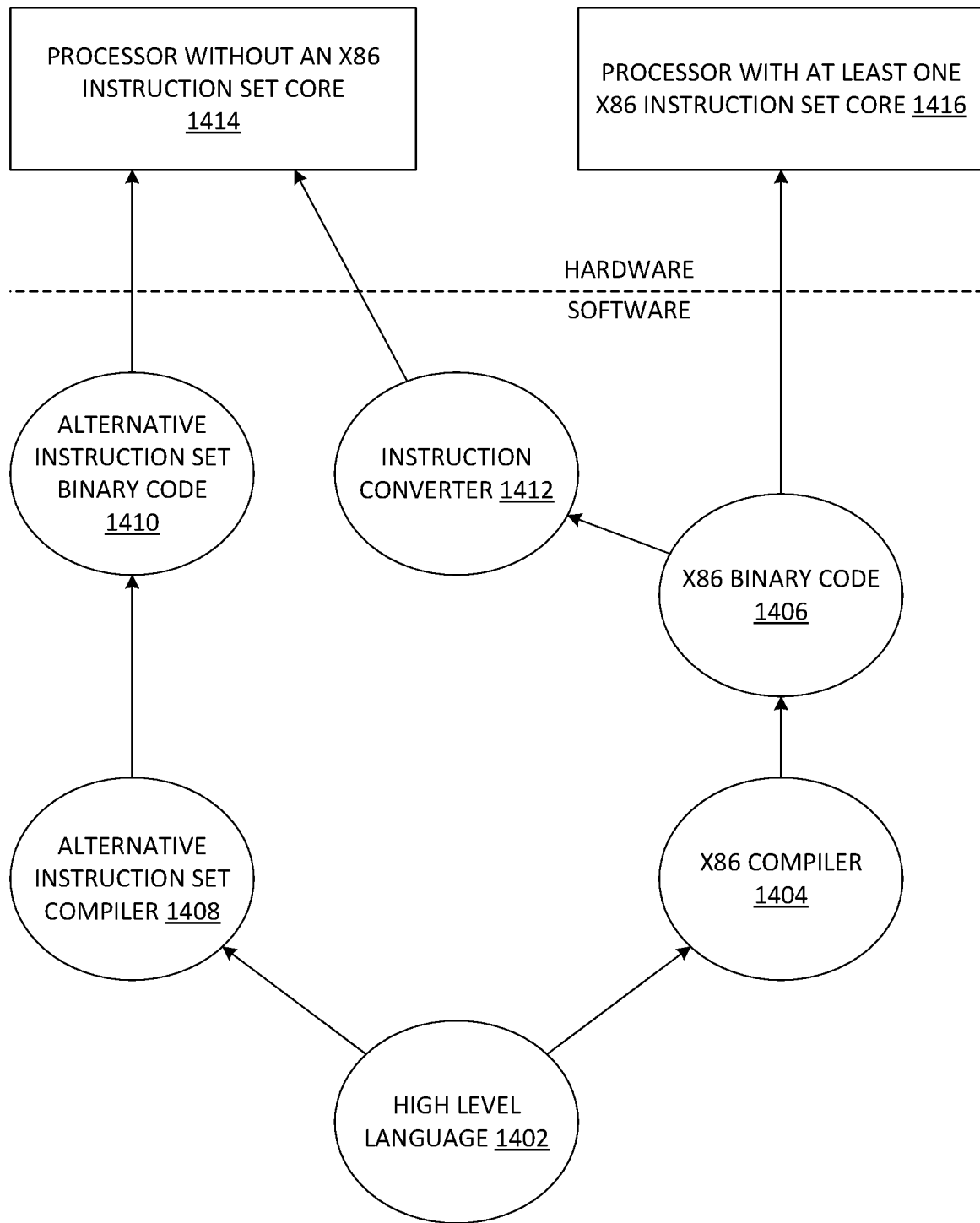
FIG. 14 is a block diagram contrasting the use of a software instruction converter to convert binary instructions in a source instruction set to binary instructions in a target instruction set according to embodiments of the invention.

FIG. 14 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 14 shows a program in a high level language 1402 may be compiled using an x86 compiler 1404 to generate x86 binary code 1406 that may be natively executed by a processor with at least one x86 instruction set core 1416. The processor with at least one x86 instruction set core 1416 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1404 represents a compiler that is operable to generate x86 binary code 1406 (e.g., object code) that can, with or without additional linkage processing, be executed on the processor with at least one x86 instruction set core 1416. Similarly, FIG. 14 shows the program in the high level language 1402 may be compiled using an alternative instruction set compiler 1408 to generate alternative instruction set binary code 1410 that may be natively executed by a processor without at least one x86 instruction set core 1414 (e.g., a processor with cores that execute the MIPS instruction set of MIPS Technologies of Sunnyvale, CA and/or that execute the ARM instruction set of ARM Holdings of Sunnyvale, CA). The instruction converter 1412 is used to convert the x86 binary code 1406 into code that may be natively executed by the processor without an x86 instruction set core 1414. This converted code is not likely to be the same as the alternative instruction set binary code 1410 because an instruction converter capable of this is difficult to make; however, the converted code will accomplish the general operation and be made up of instructions from the alternative instruction set. Thus, the instruction converter 1412 represents software, firmware, hardware, or a combination thereof that, through emulation, simulation or any other process, allows a processor or other electronic device that does not have an x86 instruction set processor or core to execute the x86 binary code 1406.

In one or more first embodiments, an integrated circuit comprises first circuitry to receive a first message which indicates a first address which corresponds to a first line of data, and identify a first location of a skewed cache based on the message, second circuitry coupled to the first circuitry, wherein, based on the first message, the second circuitry is to move a second line from the first location to a second location of a second cache, and store the first line to the first location, wherein the first circuitry is further to receive a second message which indicates a second address which corresponds to the second line, and wherein the second circuitry is further to move the second line from the second location to the skewed cache based on the second message.

In one or more second embodiments, further to the first embodiment, the second circuitry to move the second line from the second location to the skewed cache comprises the second circuitry to swap the second line and a third line between the skewed cache and the second cache.

In one or more third embodiments, further to the second embodiment, the second line and the third line are swapped based on a valid state of the third line.

In one or more fourth embodiments, further to the first embodiment or the second embodiment, based on the first message, the second circuitry is further to evict a third line from the second location to a memory before the second circuitry is to move the second line from the first location to the second location.

In one or more fifth embodiments, further to the fourth embodiment, the second circuitry is to evict the third line based on a valid state of the third line.

In one or more sixth embodiments, further to any of the first through second embodiments, the second circuitry is to move the second line to the second location based on a valid state of the second line.

In one or more seventh embodiments, further to any of the first through second embodiments, the integrated circuit further comprises third circuitry to determine, based on the first address and a first plurality of key values, first indices which correspond to different respective sets of the skewed cache, wherein the first circuitry is to identify the first location based on the first indices, and wherein the third circuitry is further to determine second indices, after the second circuitry is to store the first line to the first location, which correspond to different respective sets of the skewed cache, the second indices based on the first address and a second plurality of key values.

In one or more eighth embodiments, a processor comprises a skewed cache, a victim cache, first circuitry coupled to the skewed cache and the victim cache, the first circuitry to move a first line from the skewed cache to the victim cache based on either one of a request to cache a second line, or a miss of a search of the skewed cache and the victim cache, and second circuitry coupled to the skewed cache and the victim cache, the second circuitry to swap the second line with a third line between the skewed cache and the victim cache based on a request to access the second line.

In one or more ninth embodiments, further to the eighth embodiment, the second line and the third line are swapped based on a valid state of the third line.

In one or more tenth embodiments, further to the eighth embodiment or the ninth embodiment, based on either one of the request to cache the second line, or the miss of the search of the skewed cache and the victim cache, and wherein the second circuitry is further to evict a fourth line from the victim cache to a memory before the first circuitry is to move the first line from the skewed cache to the victim cache.

In one or more eleventh embodiments, further to the tenth embodiment, the second circuitry is to evict the fourth line based on a valid state of the fourth line.

In one or more twelfth embodiments, further to any of the eighth through tenth embodiments, the second circuitry is to move the first line to the victim cache based on a valid state of the first line.

In one or more thirteenth embodiments, further to any of the eighth through tenth embodiments, the processor further comprises third circuitry to determine first indices which correspond to different respective sets of the skewed cache, wherein the first circuitry is to identify a first location based on the first indices, and wherein the third circuitry is further to determine second indices, after the second line is to be cached to the skewed cache, which correspond to different respective sets of the skewed cache, the second indices based on a first address and a second plurality of key values.

In one or more fourteenth embodiments, a system comprises an integrated circuit (IC) chip comprising first circuitry to receive a first message which indicates a first address which corresponds to a first line of data, and identify a first location of a skewed cache based on the message, second circuitry coupled to the first circuitry, wherein, based on the first message, the second circuitry is to move a second line from the first location to a second location of a second cache, and store the first line to the first location, wherein the first circuitry is further to receive a second message which indicates a second address which corresponds to the second line, and wherein the second circuitry is further to move the second line from the second location to the skewed cache based on the second message. The system further comprises a display device coupled to the IC chip, the display device to display an image based on a signal communicated with the IC chip.

In one or more fifteenth embodiments, further to the fourteenth embodiment, the second circuitry to move the second line from the second location to the skewed cache comprises the second circuitry to swap the second line and a third line between the skewed cache and the second cache.

In one or more sixteenth embodiments, further to the fifteenth embodiment, the second line and the third line are swapped based on a valid state of the third line.

In one or more seventeenth embodiments, further to the fourteenth embodiment or the fifteenth embodiment, based on the first message, the second circuitry is further to evict a third line from the second location to a memory before the second circuitry is to move the second line from the first location to the second location.

In one or more eighteenth embodiments, further to the seventeenth embodiment, the second circuitry is to evict the third line based on a valid state of the third line.

In one or more nineteenth embodiments, further to any of the fourteenth through fifteenth embodiments, the second circuitry is to move the second line to the second location based on a valid state of the second line.

In one or more twentieth embodiments, further to any of the fourteenth through fifteenth embodiments, the IC chip further comprises third circuitry to determine, based on the first address and a first plurality of key values, first indices which correspond to different respective sets of the skewed cache, wherein the first circuitry is to identify the first location based on the first indices, and wherein the third circuitry is further to determine second indices, after the second circuitry is to store the first line to the first location, which correspond to different respective sets of the skewed cache, the second indices based on the first address and a second plurality of key values.

In one or more twenty-first embodiments, one or more computer-readable storage media having stored thereon instructions which, when executed by one or more processing units, cause the one or more processing units to perform a method comprising receiving a first message indicating a first address which corresponds to a first line of data, based on the first message identifying a first location of a skewed cache, moving a second line from the first location to a second location of a second cache, and storing the first line to the first location, receiving a second message indicating a second address which corresponds to the second line, and based on the second message, moving the second line from the second location to the skewed cache.

In one or more twenty-second embodiments, further to the twenty-second embodiment, moving the second line from the second location to the skewed cache comprises swapping the second line and a third line between the skewed cache and the second cache.

In one or more twenty-third embodiments, further to the twenty-second embodiment, the second line and the third line are swapped based on a valid state of the third line.

In one or more twenty-fourth embodiments, further to the twenty-first embodiment or the twenty-second embodiment, the method further comprises based on the first message, evicting a third line from the second location to a memory before moving the second line from the first location to the second location.

In one or more twenty-fifth embodiments, further to the twenty-fourth embodiment, evicting the third line is based on a valid state of the third line.

In one or more twenty-sixth embodiments, further to any of the twenty-first through twenty-second embodiments, moving the second line to the second location is based on a valid state of the second line.

In one or more twenty-seventh embodiments, further to any of the twenty-first through twenty-second embodiments, the method further comprises based on the first address and a first plurality of key values, determining first indices which correspond to different respective sets of the skewed cache, wherein the first location is identified based on the first indices, and after storing the first line to the first location, determining second indices which correspond to different respective sets of the skewed cache, the second indices based on the first address and a second plurality of key values.

In one or more twenty-eighth embodiments, a method comprises receiving a first message indicating a first address which corresponds to a first line of data, based on the first message identifying a first location of a skewed cache, moving a second line from the first location to a second location of a second cache, and storing the first line to the first location, receiving a second message indicating a second address which corresponds to the second line, and based on the second message, moving the second line from the second location to the skewed cache.

In one or more twenty-ninth embodiments, further to the twenty-eighth embodiment, moving the second line from the second location to the skewed cache comprises swapping the second line and a third line between the skewed cache and the second cache.

In one or more thirtieth embodiments, further to the twenty-ninth embodiment, the second line and the third line are swapped based on a valid state of the third line.

In one or more thirty-first embodiments, further to the twenty-eighth embodiment or the twenty-ninth embodiment, the method further comprises based on the first message, evicting a third line from the second location to a memory before moving the second line from the first location to the second location.

In one or more thirty-second embodiments, further to the thirty-first embodiment, evicting the third line is based on a valid state of the third line.

In one or more thirty-third embodiments, further to any of the twenty-eighth through twenty-ninth embodiments, moving the second line to the second location is based on a valid state of the second line.

In one or more thirty-fourth embodiments, further to any of the twenty-eighth through twenty-ninth embodiments, the method further comprises based on the first address and a first plurality of key values, determining first indices which correspond to different respective sets of the skewed cache, wherein the first location is identified based on the first indices, and after storing the first line to the first location, determining second indices which correspond to different respective sets of the skewed cache, the second indices based on the first address and a second plurality of key values.

Techniques and architectures for operating a cache memory are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An integrated circuit comprising:
   first circuitry to:
   receive a first message which indicates a first address which corresponds to a first line of data; and
   identify a first location of a skewed cache based on the message;
   second circuitry coupled to the first circuitry, wherein, based on the first message, the second circuitry is to:
   move a second line from the first location to a second location of a second cache; and
   store the first line to the first location;
   wherein the first circuitry is further to receive a second message which indicates a second address which corresponds to the second line; and
   wherein the second circuitry is further to move the second line from the second location to the skewed cache based on the second message.

2. The integrated circuit of claim 1, wherein the second circuitry to move the second line from the second location to the skewed cache comprises the second circuitry to swap the second line and a third line between the skewed cache and the second cache.

3. The integrated circuit of claim 2, wherein the second line and the third line are swapped based on a valid state of the third line.

4. The integrated circuit of claim 1, wherein, based on the first message, the second circuitry is further to evict a third line from the second location to a memory before the second circuitry is to move the second line from the first location to the second location.

5. The integrated circuit of claim 4, wherein the second circuitry is to evict the third line based on a valid state of the third line.

6. The integrated circuit of claim 1, wherein the second circuitry is to move the second line to the second location based on a valid state of the second line.

7. The integrated circuit of claim 1, further comprising:
   third circuitry to determine, based on the first address and a first plurality of key values, first indices which correspond to different respective sets of the skewed cache;
   wherein the first circuitry is to identify the first location based on the first indices; and
   wherein the third circuitry is further to determine second indices, after the second circuitry is to store the first line to the first location, which correspond to different respective sets of the skewed cache, the second indices based on the first address and a second plurality of key values.

8. A processor comprising:
   a skewed cache;
   a victim cache;
   first circuitry coupled to the skewed cache and the victim cache, the first circuitry to move a first line from the skewed cache to the victim cache based on either one of:
   a request to cache a second line; or
   a miss of a search of the skewed cache and the victim cache; and
   second circuitry coupled to the skewed cache and the victim cache, the second circuitry to swap the second line with a third line between the skewed cache and the victim cache based on a request to access the second line.

9. The processor of claim 8, wherein the second line and the third line are swapped based on a valid state of the third line.

10. The processor of claim 8, wherein, based on either one of:
    the request to cache the second line; or the miss of the search of the skewed cache and the victim cache; and wherein the second circuitry is further to evict a fourth line from the victim cache to a memory before the first circuitry is to move the first line from the skewed cache to the victim cache.

11. The processor of claim 10, wherein the second circuitry is to evict the fourth line based on a valid state of the fourth line.

12. The processor of claim 8, wherein the second circuitry is to move the first line to the victim cache based on a valid state of the first line.

13. The processor of claim 8, further comprising:
third circuitry to determine first indices which correspond to different respective sets of the skewed cache;
wherein the first circuitry is to identify a first location based on the first indices; and
wherein the third circuitry is further to determine second indices, after the second line is to be cached to the skewed cache, which correspond to different respective sets of the skewed cache, the second indices based on a first address and a second plurality of key values.

14. A system comprising:
an integrated circuit (IC) chip comprising:
first circuitry to:
receive a first message which indicates a first address which corresponds to a first line of data; and
identify a first location of a skewed cache based on the message;
second circuitry coupled to the first circuitry, wherein, based on the first message, the second circuitry is to:
move a second line from the first location to a second location of a second cache; and
store the first line to the first location;
wherein the first circuitry is further to receive a second message which indicates a second address which corresponds to the second line; and
wherein the second circuitry is further to move the second line from the second location to the skewed cache based on the second message; and
a display device coupled to the IC chip, the display device to display an image based on a signal communicated with the IC chip.

15. The system of claim 14, wherein the second circuitry to move the second line from the second location to the skewed cache comprises the second circuitry to swap the second line and a third line between the skewed cache and the second cache.

16. The system of claim 15, wherein the second line and the third line are swapped based on a valid state of the third line.

17. The system of claim 14, wherein, based on the first message, the second circuitry is further to evict a third line from the second location to a memory before the second circuitry is to move the second line from the first location to the second location.

18. The system of claim 17, wherein the second circuitry is to evict the third line based on a valid state of the third line.

19. The system of claim 14, wherein the second circuitry is to move the second line to the second location based on a valid state of the second line.

20. The system of claim 14, the IC chip further comprising:
third circuitry to determine, based on the first address and a first plurality of key values, first indices which correspond to different respective sets of the skewed cache;
wherein the first circuitry is to identify the first location based on the first indices; and
wherein the third circuitry is further to determine second indices, after the second circuitry is to store the first line to the first location, which correspond to different respective sets of the skewed cache, the second indices based on the first address and a second plurality of key values.

* * * * *